Aug. 13, 1963     A. L. BROCKWAY, JR     3,100,891
GROUND CONTROLLED APPROACH INDICATOR SYSTEM
Original Filed Oct. 26, 1954     13 Sheets-Sheet 1

ARTHUR L. BROCKWAY, JR.
*INVENTOR.*

BY

*ATTORNEYS*

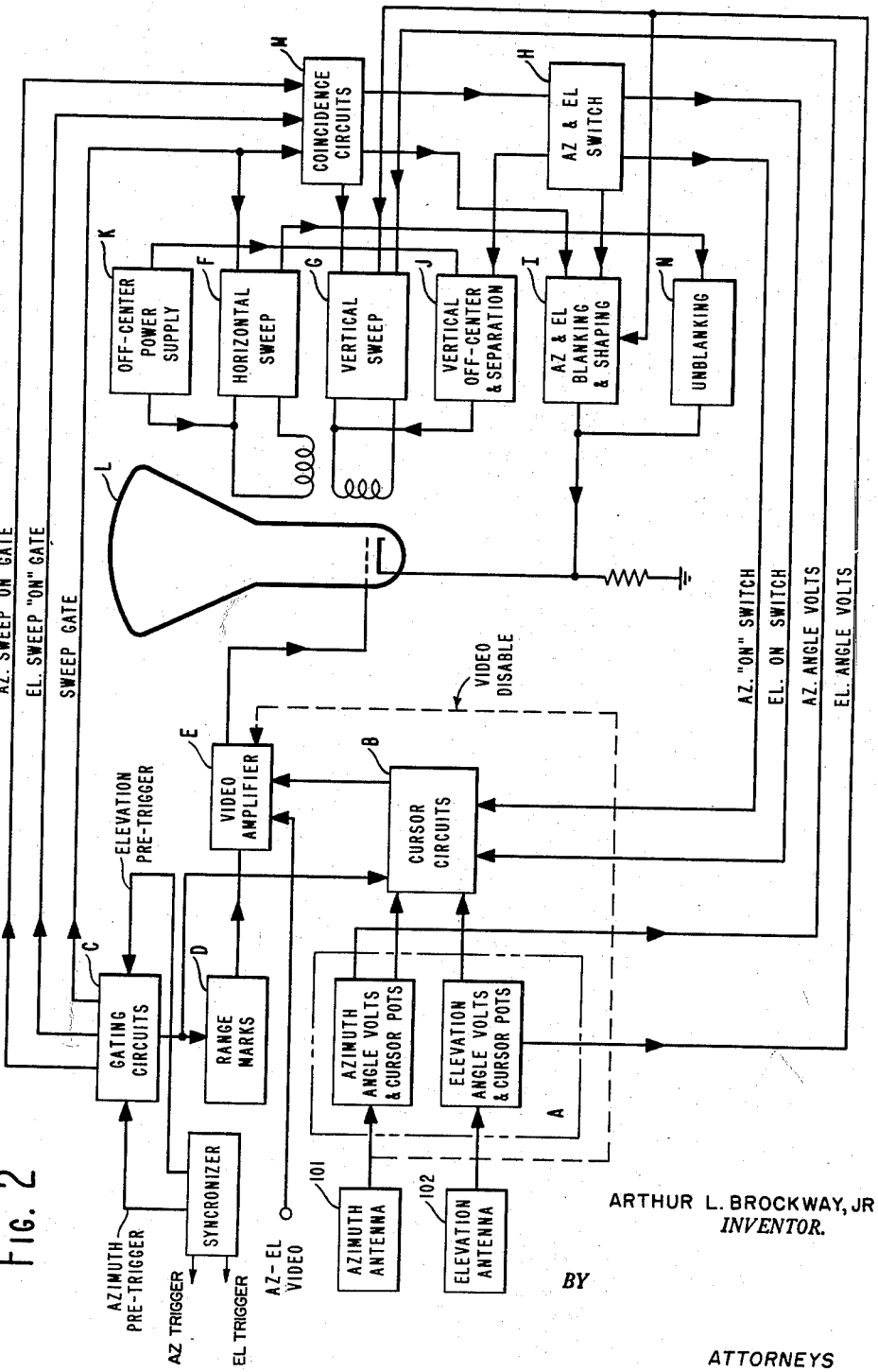

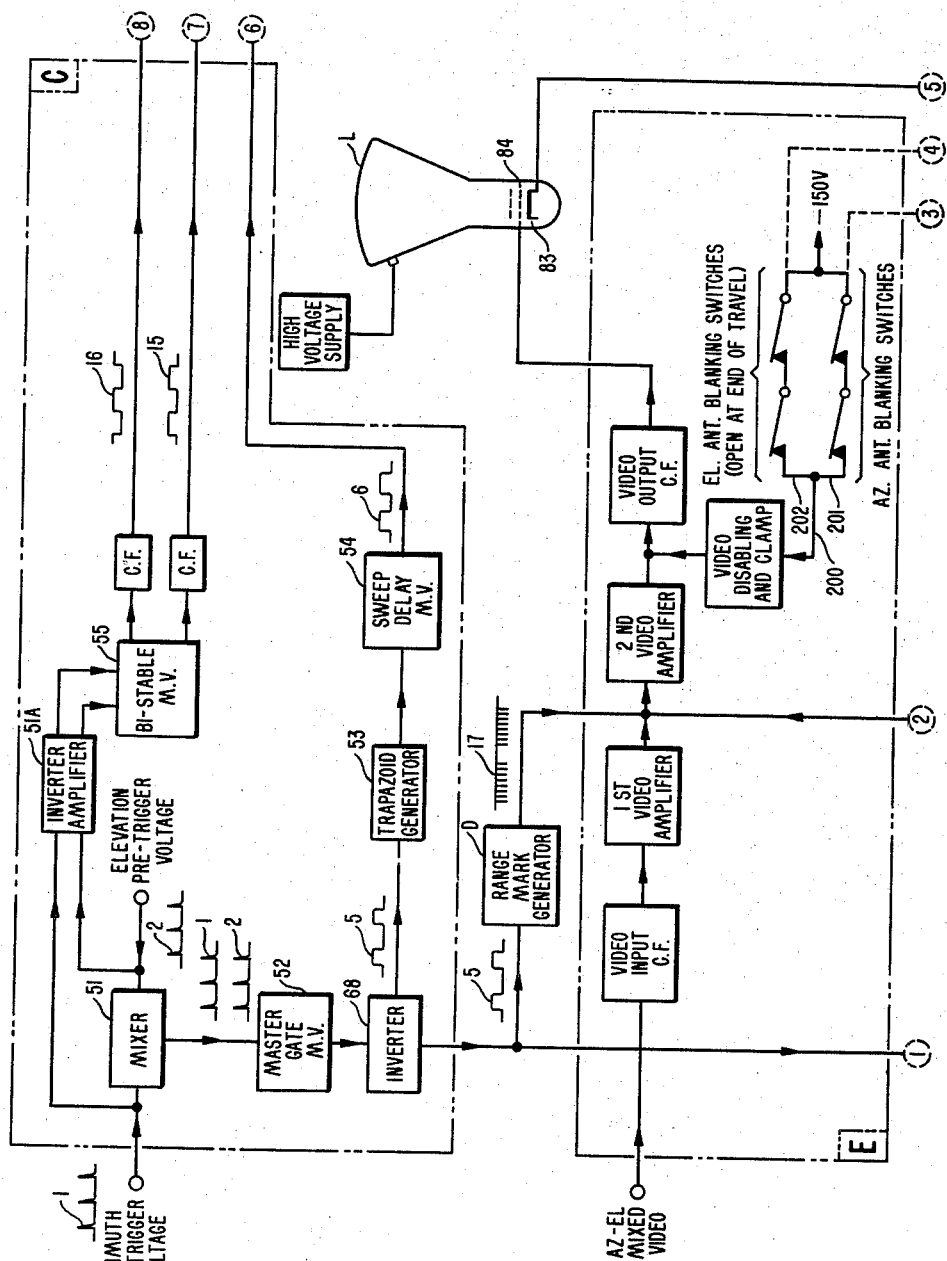

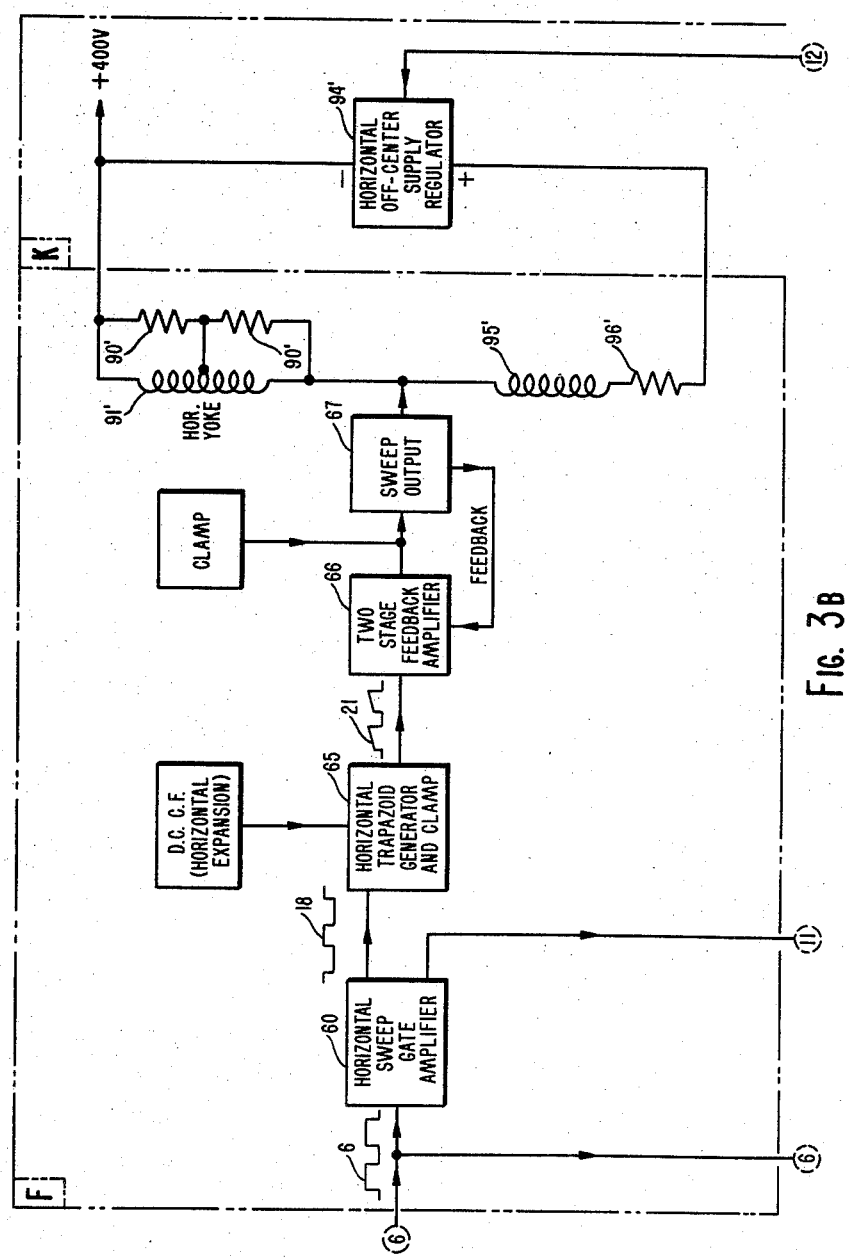

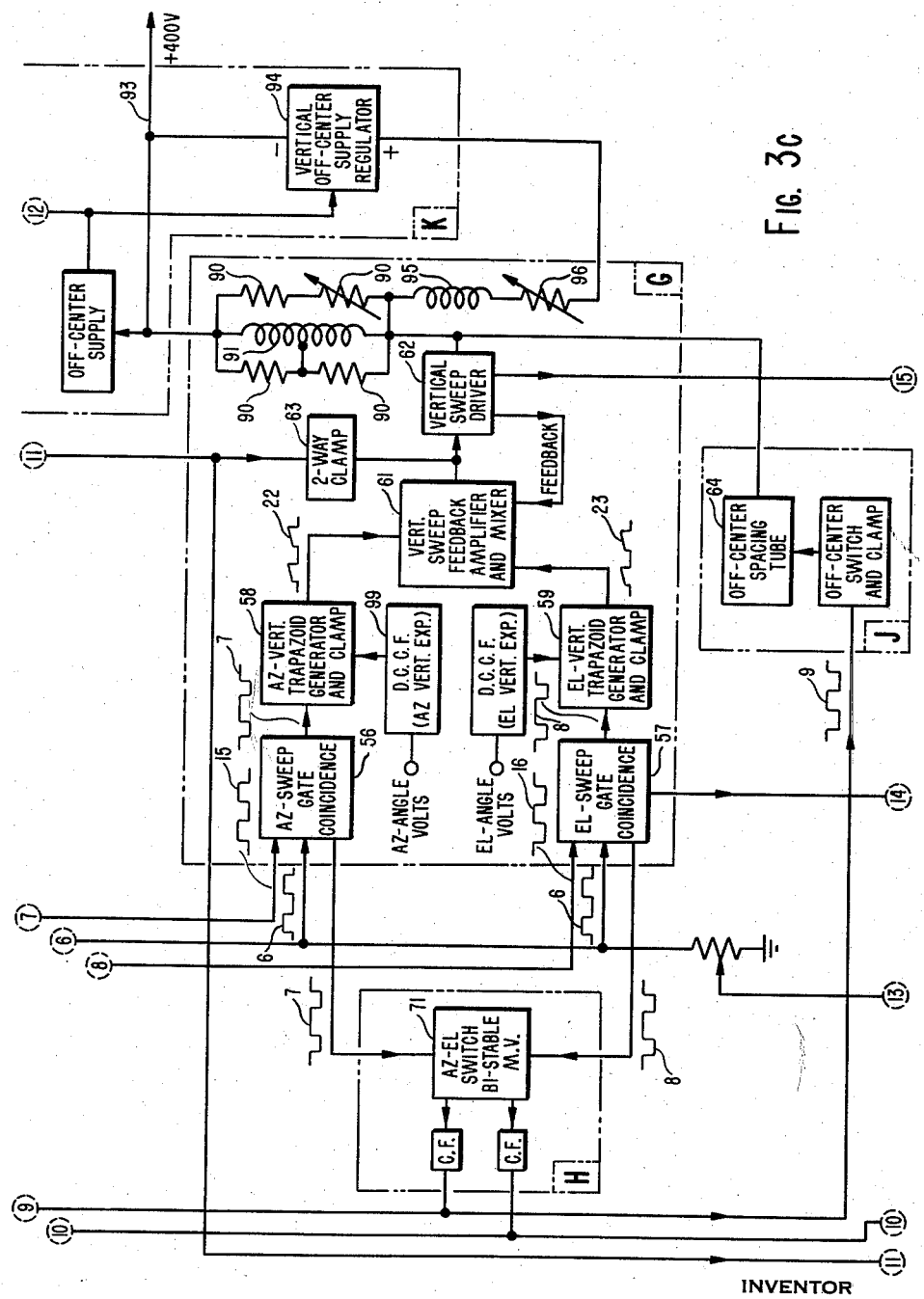

INVENTOR.
BY
ATTORNEYS

ARTHUR L. BROCKWAY, JR.
INVENTOR.

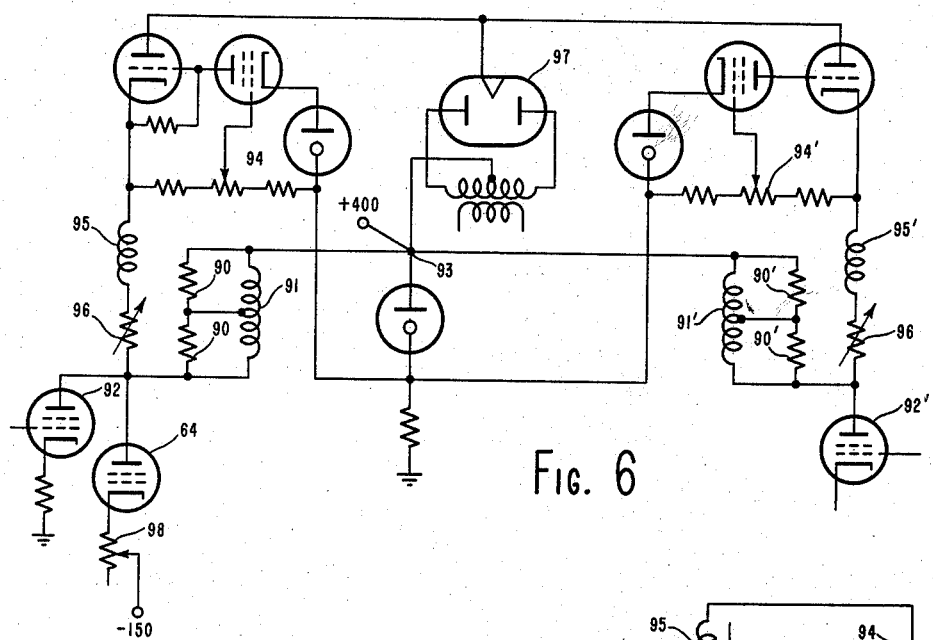
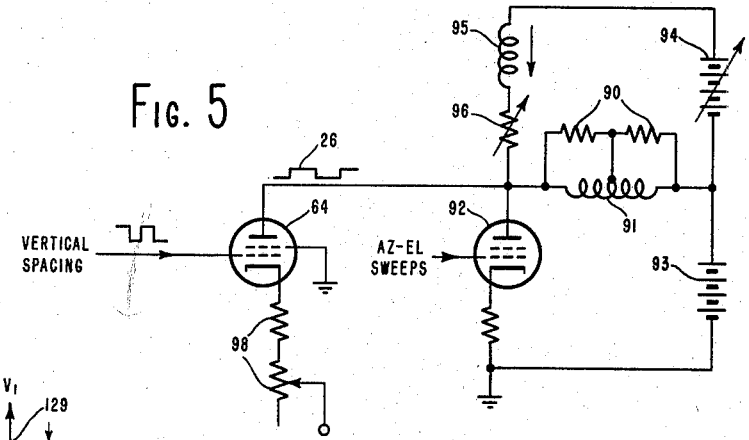
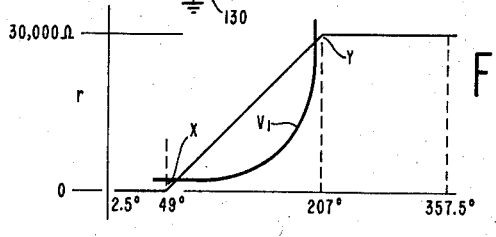

Aug. 13, 1963  A. L. BROCKWAY, JR  3,100,891
GROUND CONTROLLED APPROACH INDICATOR SYSTEM
Original Filed Oct. 26, 1954  13 Sheets-Sheet 12

ARTHUR L. BROCKWAY, JR.
INVENTOR.

BY

ATTORNEYS

United States Patent Office 3,100,891
Patented Aug. 13, 1963

3,100,891
GROUND CONTROLLED APPROACH
INDICATOR SYSTEM
Arthur L. Brockway, Jr., Baltimore County, Md., assignor to The Bendix Corporation, a corporation of Delaware
Original application Oct. 26, 1954, Ser. No. 464,825. Divided and this application Mar. 17, 1959, Ser. No. 800,011
7 Claims. (Cl. 343—11)

This application is a division of Serial No. 464,825, now U.S. Patent No. 3,014,213.

This invention relates to ground controlled approach (GCA) systems and more particularly to a system for presenting azimuth and elevation information as a composite display.

In the earliest GCA systems azimuth information was presented on one cathode ray tube and elevation information on another, each presentation being watched by a separate operator. In later systems it was realized that a reduction in the number of observers could be obtained by presenting both displays on a single tube screen. This manner of presentation has been called "Az—El" presentation.

In GCA installations using the Az—El form of presentation it has been customary to generate the complete azimuth and elevation presentations in alternation. A display generated in this manner has the disadvantage of appearing to flicker since it is not possible to generate complete sectorial P.P.I. type indications rapidly enough so that persistence of vision will provide the appearance of a steady picture.

It is, accordingly, an object of the invention to provide means for generating an Az—El presentation in line by line alternation, whereby flicker is eliminated.

Each of the Az and El presentations is a distorted sector of a P.P.I. presentation off-centered to a different location on the tube face. This means that the point of origin for the sweeps has to be shifted with each line. An off-centering circuit alternating between two stable conditions is required for this purpose. One of the difficulties previously encountered in Az—El displays has been that of obtaining a restoration of the value of current flowing in the deflection coil at the beginning of each sweep within the restoration time available. Failure to achieve such restoration results in the existence of a transient current which produces an effect known as "walking" of the display, characterized by movement of the origins.

It is another object of the invention to provide displays which may be readily adjusted to have point origins which are stable under ordinary scanning conditions.

GCA presentations traditionally include what are known as "cursor" and "wave-off" lines. Cursor lines mark the path down which it is desired that the plane land. In the azimuth presentation the cursor line represents the center of the runway. In the elevation presentation it represents the glide path as seen from a lateral position. Wave-off lines are lines appearing on the display on both sides of and close to the cursor lines. They mark the limits of permissible deviation of the location of a landing aircraft from the glide path. When the indication of the target aircraft appears on the display outside of the wave-off lines of either the Az or the El presentation the GCA operator instructs the aircraft to turn away, gain altitude and repeat the approach. This operation is termed a "wave-off."

In the early GCA systems these lines were physically inscribed or printed on masks which were placed over the tube face. This expedient, however, is unsatisfactory since the presentation may not always be readily positioned or maintained in accurate register with the mask lines. Parallax is also a frequent fault with this type of cursor presentation. It would be better to generate these lines electronically by means of the cathode ray beam, in such a manner that any error or movement of the display would also be applied to the lines, thus reducing or eliminating relative discrepancies between the lines and the rest of the display.

It would be advantageous to generate cursor and wave-off lines by intensifying for each line a spot on each sweep trace of the cathode ray beam. All the intensified spots for each line would, in the aggregate, trace the desired line.

Attempts have been made to generate lines in this fashion, but these attempts have resulted in systems which present several defects or limitations.

In the use of GCA systems the equipment is usually truck mounted so that it can be shifted from runway to runway as conditions demand. It is also desirable for maximum accuracy that the system be located quite close to the runway in use. In shifting the equipment from runway to runway the speed with which the operation can be accomplished is a matter of great importance.

In attempts previously made to generate cursor and wave-off lines electronically great difficulty has been encountered in meeting the above requirements. The systems devised have necessitated the following of an elaborate procedure of adjustment of the lines when moving from one location to a new location. This procedure involved precision setting of a number of dials, use of several correction charts and the repeating of a number of adjustment steps due to control interaction. These systems were also very sensitive to the accuracy of positioning of the equipment in accordance with a predetermined orientation.

The range of operation of these systems is limited by the circuitry involved, rendering a close positioning of the system to the runway difficult to achieve.

It is a further object of the present invention to provide an indicator system with electronically generated cursor and wave-off lines, in which adjustment of cursor lines in moving to a new runway location is simply and easily accomplished.

It is another object of the invention to provide such a system in which adjustment of the cursor lines automatically adjusts the wave-off lines to maintain the proper slope with respect to the cursor lines.

It is a still further object of the invention to provide such a system which can be positioned close to a runway without loss of accuracy.

It is another object of the invention to provide such a system which need not be accurately positioned with respect to a runway in order to be easily adjusted for operation.

These and other objects and advantages of the invention are realized by an indicating system in which the azimuth and elevation presentations are switched after each pulse interval. The cursor and wave-off lines are generated by circuits in which a fixed amplitude sawtooth voltage is initiated during each interval between transmitted pulses. This voltage is applied to a pick-off diode biased by a D.C. voltage related to the antenna scan position. The output of the pick-off diode is applied to wave shaping circuits which increase the rise time thereof and differentiate the resulting waveform. The positive spike coincident with the leading edge of the waveform triggers a blocking oscillator to generate a pulse which is applied to the video circuits and which produces an intensification of the sweep trace.

The wave-off lines are generated by similar means. The difference in output necessary to trace the different lines arise in differences in the configurations and driving linkages of potentiometers driven in accordance with the scan of the azimuth and elevation antennas.

Walking of the point of original of the Az and El displays is eliminated by means of a resistor, an inductor and a D.C. voltage source serially connected and shunted across the vertical deflection yoke with the voltage so polarized and the time constants of the shunt so regulated that the changing current through the deflection yoke due to its recovery from the preceding sweep exactly equals and opposes the current flowing through the yoke due to the recovery of the coil from the same sweep, at the instant at which the next succeeding sweep is initiated. This situation remains effective as the sweep amplitude varies through the scanning range.

In the drawings:

FIG. 2 is a block schematic diagram of a GCA indicator system embodying the invention;

FIGS. 3, 3A, 3B, 3C and 3D are block schematic diagrams of portions of the system of FIG. 2 showing the system broken down more specifically into its elements;

FIG. 5 is a schematic diagram of a portion of the circuit of FIG. 6;

FIG. 6 is a schematic circuit diagram of the deflection system of the overall system of FIGS. 2 and 3;

FIG. 9 is a graph of the resistance curve of one of the potentiometers employed in the system of FIG. 2 between the antennas and the cursor and wave-off line generators;

FIG. 9a is a schematic diagram of a potentiometer of the type to which FIG. 9 pertains; and, FIG. 10 is a schematic diagram of a portion of the vertical sweep circuit.

The Indicator System Generally

The Az—El indicator provides in a composite view on a single cathode ray tube (CRT) a continuous unflickering display of all of the indices in azimuth and elevation required for the safe and efficient landing of aircraft. The system which provides these indices is arranged to permit rapid and accurate adjustments without interaction among the various circuits and a high degree of flexibility for employment with various runway situations.

The indicator includes vertical and horizontal deflection circuits which produce an Az—El display corresponding to the respective scans of the azimuth and elevation antennas with successive range sweeps alternating between the azimuth and elevation systems. Other circuits provide electronic cursors on the displays which represent the azimuth runway courseline and the elevation glidepath, and waveoff lines spaced a predetermined distance therefrom. Blanking and clipping circuits are incorporated to present the Az—El display without interference between the two portions and for maximum ultization of the screen area of the CRT. Conventional logarithmic range marks are generated electronically and provided on the display and gating and switching voltages are provided to all units to correlate the timing of the various functions.

Figure 1:
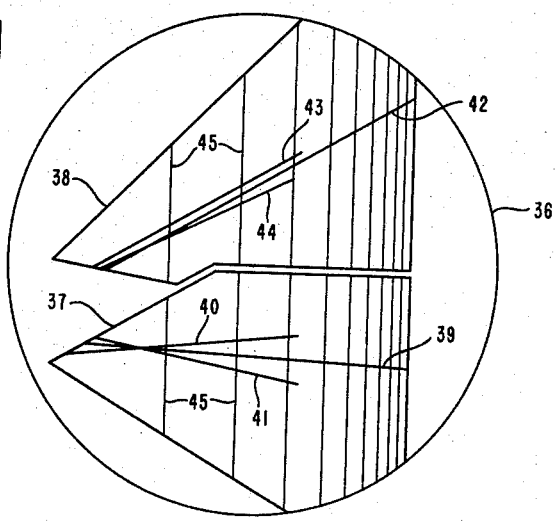
FIG. 1 is a plan view of a cathode ray tube screen having formed on it an Az—El presentation of the type contemplated by the invention.

Such an indicator screen is shown in FIG. 1, which illustrates a round screen 36 with an azimuth (Az display 37 and an elevation (El) display 38. On the Az display the cursor line is the horizontal line 39 and the two wave-off lines are the lines 40 and 41. On the El display, the cursor line is the line 42 and the two wave-off lines are the lines 43 and 44. The line 43 is termed the No. 1 wave-off line on the El display and represents a line in space parallel to the glide path and about fifty feet above it. The line 44, known as the No. 2 wave-off line, makes an angle with the glide path which is adjustable and is usually adjusted to a slope of about fifty feet per mile. On the azimuth display line 40 is the No. 1 wave-off line and 41 is the No. 2 line if the system is positioned to the left of the runway. Each wave-off line represents a line in space making an angle with the approach path having a slope of about two hundred feet per mile. The wave-off lines extend for about three miles whereas the cursor line extends for about ten miles. Range marks 45 at one mile intervals are shown. The range mark spacing is logarithmic in order that deviations from the approach path may be more apparent as an aircraft approaches touchdown. The left hand range mark appears at the touchdown point.

FIG. 2 illustrates a block schematic diagram of a system for providing a display of the type shown in FIG. 1, the blocks being identified by reference letters.

An azimuth antenna 101 and an elevation antenna 102 drive a group of angle voltage and cursor potentiometers A. The cursor and wave-off line voltages generated therein are applied to a group of cursor and wave-off circuits B the output of which is applied to video amplifier circuits E.

A group of gating circuits C, driven by Az and El pre-trigger voltages generated elsewhere in the system, provide gates which are applied to the cursor circuits B and to range mark generating circuits D. The output of the latter is applied to the video amplifier circuits E. The video Az and El signals are also applied to these circuits. The output of the video amplifiers is applied to the control grid of a CRT L.

The CRT is provided with an electromagnetic deflection yoke comprising vertical and horizontal deflection coils for producing the sweeps of the cathode ray beam and these coils are driven by horizontal and vertical sweep circuits F and G respectively. A power supply circuit K provides supply voltages for off-centering. The gating circuits C supply gating voltages to the horizontal sweep F and also to the coincidence circuits M which in turn drive an Az and El switch H, the vertical sweep G, and the blanking circuits I. The Az and El switch H provides switching voltages to a vertical off-centering and separation circuit J and an Az and El blanking and shaping circuit I.

Angle voltage from the angle voltage potentiometers of block A is applied to the vertical sweeps G and the blanking circuit I. The output of the Az and El switch H is also applied to the cursor circuits B. The output of the Az and El blanking and shaping circuits I is applied to the cathode of the CRT, together with the output of an unblanking circuit N which is driven by a signal coming from the horizontal sweep circuits.

Generating the Az—El Map

Referring to the block diagram of FIGS. 3 to 3D and the waveforms of FIGS. 4 and 4A, the generation of the Az—El map will be described. Referring first to FIG. 3, Az and El pre-triggers 1, 2 which are generated elsewhere and occur 20.8μ seconds before the respective Az and El transmitted pulses, waveforms 3 and 4, are applied to a mixer 51 which triggers a monostable multivibrator 52 with an adjustable "on" time to produce the master gate which is inverted in inverter 68 to produce gate 5. Gate 5 is applied to a trapezoid generator 53 which provides an adjustable delay in initiating multivibrator 54 to produce sweep gate 6. The trailing edge of the negative going excursion of gate 5 is effective to terminate the positive going excursion of gate 6 simultaneously. The pretriggers 1, 2, also operate a bistable multivibrator 55 through inverter amplifiers 51A, which generates the Az and El sweep "on" gates 15, 16.

The horizontal sweep gate 6 is applied as one input signal to Az and El sweep gate coincidence tubes 56, 57 (FIG. 3C). Az coincidence tube 56 receives Az sweep "on" gate 15 and produces an Az sweep gate 7 upon coincidence of positive gates 6 and 15. El coincidence tube 57 similarly produces El sweep gate 8 from positive gates 6 and 16. Waveforms 7, 8 are applied to respective Az and El vertical clamped trapezoid generators 58, 59 which will be more fully described. The generators 58, 59 produce variable amplitude and polarity trapezoids 22, 23 in accordance with the respective antenna angle voltages. The trapezoids 22, 23 are mixed and amplified in a vertical sweep feedback amplifier 61, the output of which is applied to a vertical sweep driver 62. The junction therebetween is clamped to the bias voltage for the driver 62 by a clamp gate generator 63 which is switched by wave 18 from a horizontal sweep gate amplifier 60. Current from the sweep driver 62 is drawn through the vertical deflection yoke system to produce the desired vertical component of beam deflection. A vertical off-centering tube 64 alternately switches a constant value of current on and off through the vertical deflection system for providing the displacement between origins of the Az and El displays.

Referring to FIG. 3B, the horizontal deflection in the indicator of the present invention has a constant maximum value and is derived from the wave 18 which is the inverted form of wave 6 applied to amplifier 60. Wave 18 switches a clamped trapezoid generator 65 which is referred to an adjustable D.C. voltage for horizontal expansion control. The horizontal trapezoid 21 has a logarithmic rise and is amplified in a feedback amplifier 66, the output of which is clamped and connected to a horizontal driver 67. The driver 67 controls the sweep current through the horizontal deflection system.

Figure 4:
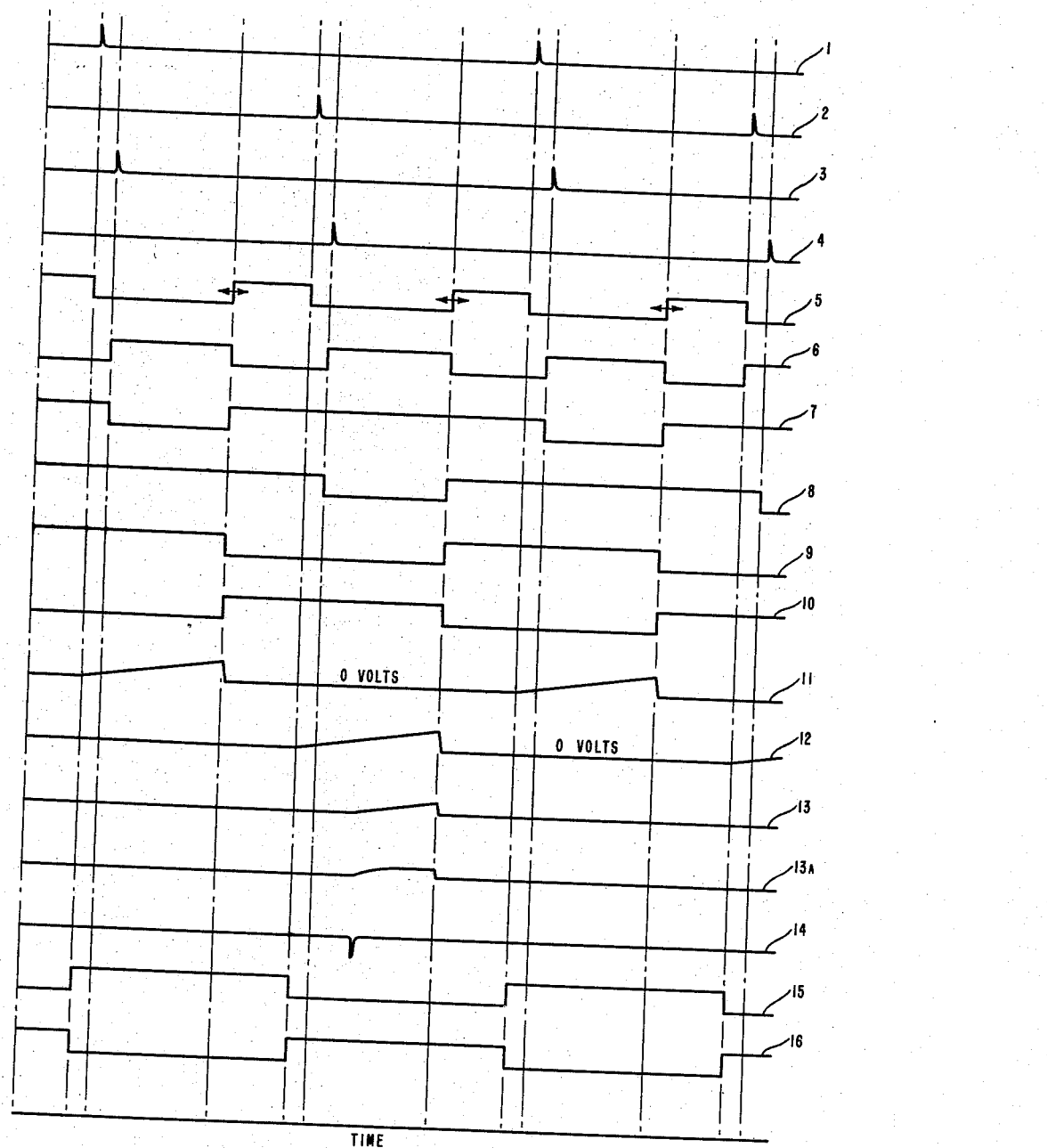
FIGS. 4 and 4A are groups of curves drawn to a common time base showing waveforms occurring at different points in the system of FIGS. 2 and 3.
Figure 4A:
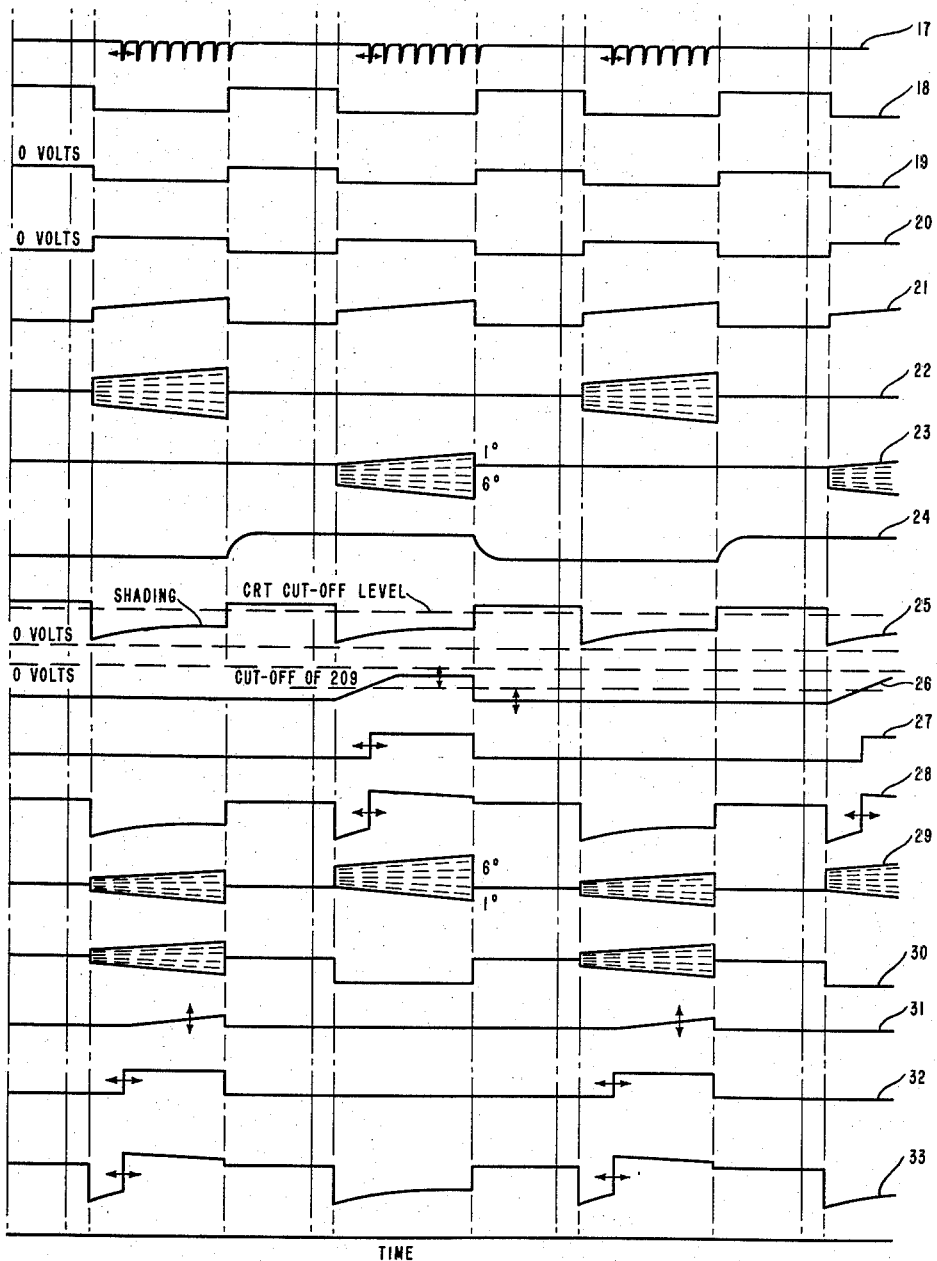

The basic difference between the horizontal sweep waveform 21 and the vertical sweep waveforms 22 and 23, as seen in FIG. 4A, is that the vertical sweep waveforms vary in both amplitude and polarity whereas the horizontal sweep waveform varies only in amplitude. Furthermore, once the amplitude of the horizontal sweep has been adjusted to give the desired presentation, it is not altered.

Figure 10:
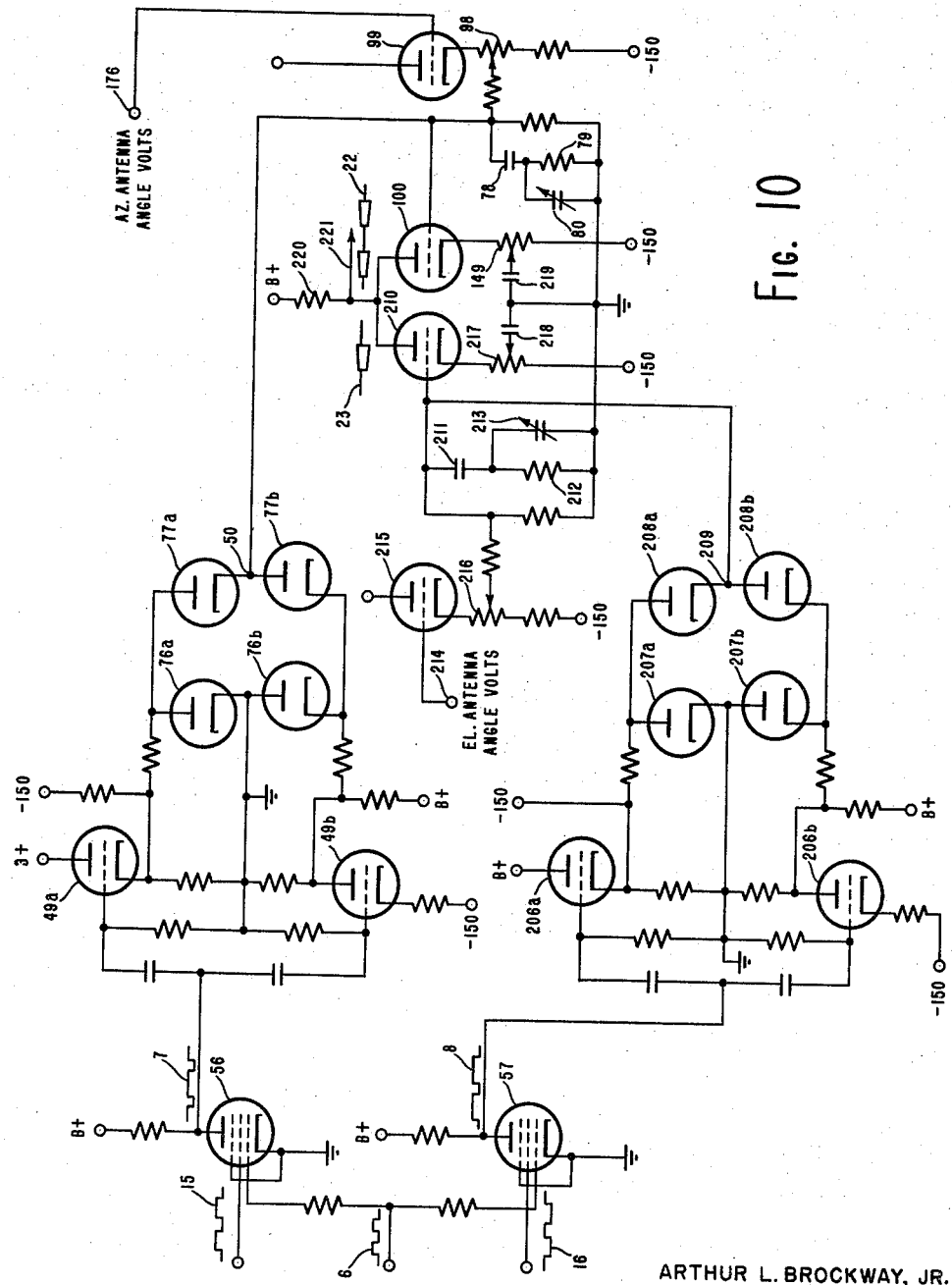

In the functioning of the vertical sweep circuit, as illustrated in part in FIG. 10, during the time of the azimuth sweep the negative 122 microsecond gate output 7 of the Az sweep gate coincidence tube 56 is applied to the control grids of tubes 49a and 49b. The cathode of tube 49a and plate of tube 49b are connected by way of load resistors to ground. The cathode of 49b is connected to the negative terminal of the 150 volt source and the plate of 49a is connected to a source of positive voltage such that the outputs of the two tubes are equal for the same input. The output of cathode follower 49a is applied in parallel to the plates of two diodes 76a and 77a. The output of tube 49b is applied in parallel to the cathodes of two diodes 76b and 77b. The remaining electrodes of diodes 76a and 76b are grounded while those of diodes 77a and 77b are connected to a common point 50. Tubes 49a and 49b, together with tubes 76a, 76b, 77a and 77b, constitute a push-pull clamper circuit, which will clamp to ground both positive and negative waveforms. When 49a is cut-off, a negative pulse 122 microseconds long is applied to the plates of clampers 76a and 77a cutting off these tubes. At the same time, a positive 122 microsecond pulse is applied by 49b to the cathodes of clampers 76b and 77b, cutting off these tubes.

At the instant the clampers are cut off the junction 50 of the cathode of 77a and the plate of 77b is at ground potential. This junction is connected to one terminal of a condenser 78, the other terminal of which is grounded through a resistor 79 which is by-passed by a variable condenser 80. The point 50 is also connected by way of the arm of a potentiometer 98 to the cathode of a triode 99 connected as a cathode follower. The point 50 is also connected to the control grid of a triode 100. Azimuth antenna angle voltage is applied to the control grid of cathode follower 99 from terminal 176.

At the instant the clampers are cut off the point 50 is at ground potential and the voltage across condenser 78 is zero volts. If the azimuth antenna is at the center of its travel, which is the zero-degree scan point, the Az angle volts input is zero volts and so is the output of potentiometer 98 which is connected to the cathode of cathode follower 99. Thus the voltage across condenser 78 remains at zero volts.

If the azimuth antenna is at the ten degree right scan point, the voltage output of the cathode follower 99 will be some positive value. At the instant the gates are applied to cut off tubes 77a and 77b there will be no charge on condenser 78. However, a jump voltage will be developed across resistor 79 and capacitor 78 will begin to charge from the jump voltage to some positive voltage, depending on the amplitude of the angle voltage input. This will result in the application of a positive trapezoidal voltage to the grid of tube 100.

When the angle voltage input becomes negative, the circuit functions in exactly the same manner. However, under these conditions a negative trapezoidal waveform is applied to the control grid of tube 100. The purpose of the potentiometer 149 seen in the cathode lead of the tube 100 is to vary the gain of the tube by inserting more or less un-bypassed resistance into the cathode circuit.

The El vertical sweep circuits are constructed and function in exactly the same manner as the Az vertical sweep circuits described above, except that the trapezoidal waveform generated in the El vertical circuits goes approximately six times more negative than it does positive. The reason is that the El antenna scans from approximately plus six degrees to minus one degree whereas the Az antenna scans from ten degrees left to the ten degrees right.

Continuing with reference to FIG. 10, during the time of the El sweep, the negative 122 microsecond pulse output 8 of the El sweep gate coincidence tube 57 is applied to the control grids of two tubes 206a and 206b, cutting off these stages. These tubes are connected in the same manner and perform the same functions as tubes 49a and 49b described above. Their outputs are applied to a two way clamper composed of tubes 207a, 207b, 208a and 208b which correspond in arrangement and function to tubes 76a and b and 77a and b in the Az vertical sweep circuit. As the tubes 206a and 206b are cut off the voltage at the junction point 209 of the cathode of 208a and the plate of 208b will be zero volts.

This junction is connected directly to the control grid of a tube 210, connected in the same manner as tube 100 and forming a mixer with that tube. It is also directly connected to one terminal of a condenser 211, the remaining terminal of which is connected through a resistor 212 to ground. This latter resistor is bypassed by a variable condenser 213. El antenna angle voltage is applied from a terminal 214 to the control grid of a cathode follower 215 which serves the same function as the cathode follower 99. A potentiometer 216 is connected in its cathode circuit and the arm thereof is connected through a resistance to the junction point 209.

When the tubes 206a and b are cut off, the junction point 209 will remain at zero potential during the sweep, if the angle voltage being applied to tube 215 is zero. If the angle voltage is other than zero volts a jump voltage is developed across resistor 212 and condenser 211 starts to charge in a direction determined by the polarity of the angle voltage input. Condenser 213 is used to make the rise time of the elevation vertical sweep trapezoid the same as the rise time of the horizontal sweep trapezoid.

Accomplishing this tends to eliminate any hooks or curves in the start of the sweep. A potentiometer 217 in the cathode circuit of the tube 210 serves the same purpose as the potentiometer 149. The arms of these potentiometers are connected by condensers 218, 219 respectively to ground, and serve to by pass the lower ends of the potentiometer resistors.

Figure 3A:
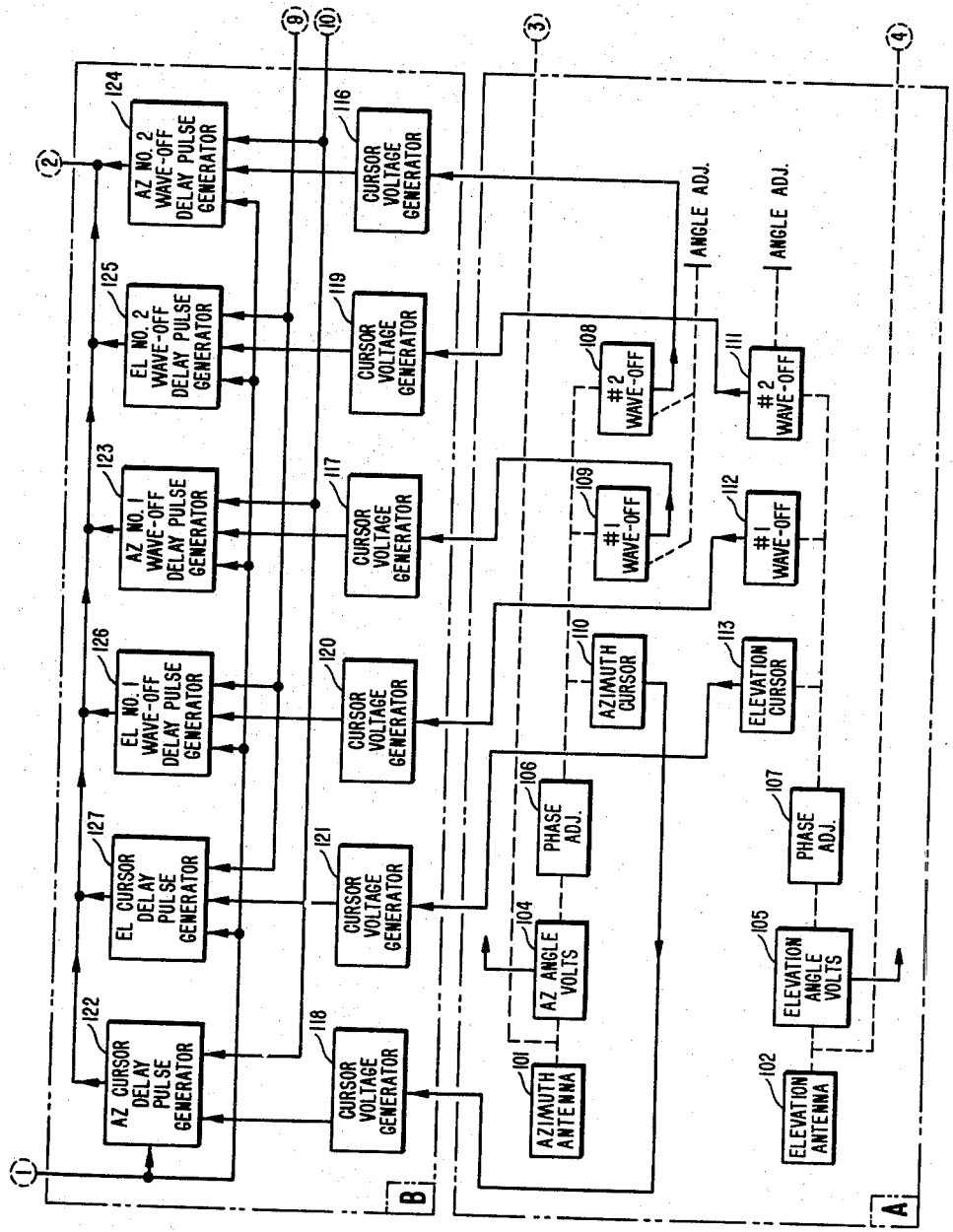
Figure 3D:
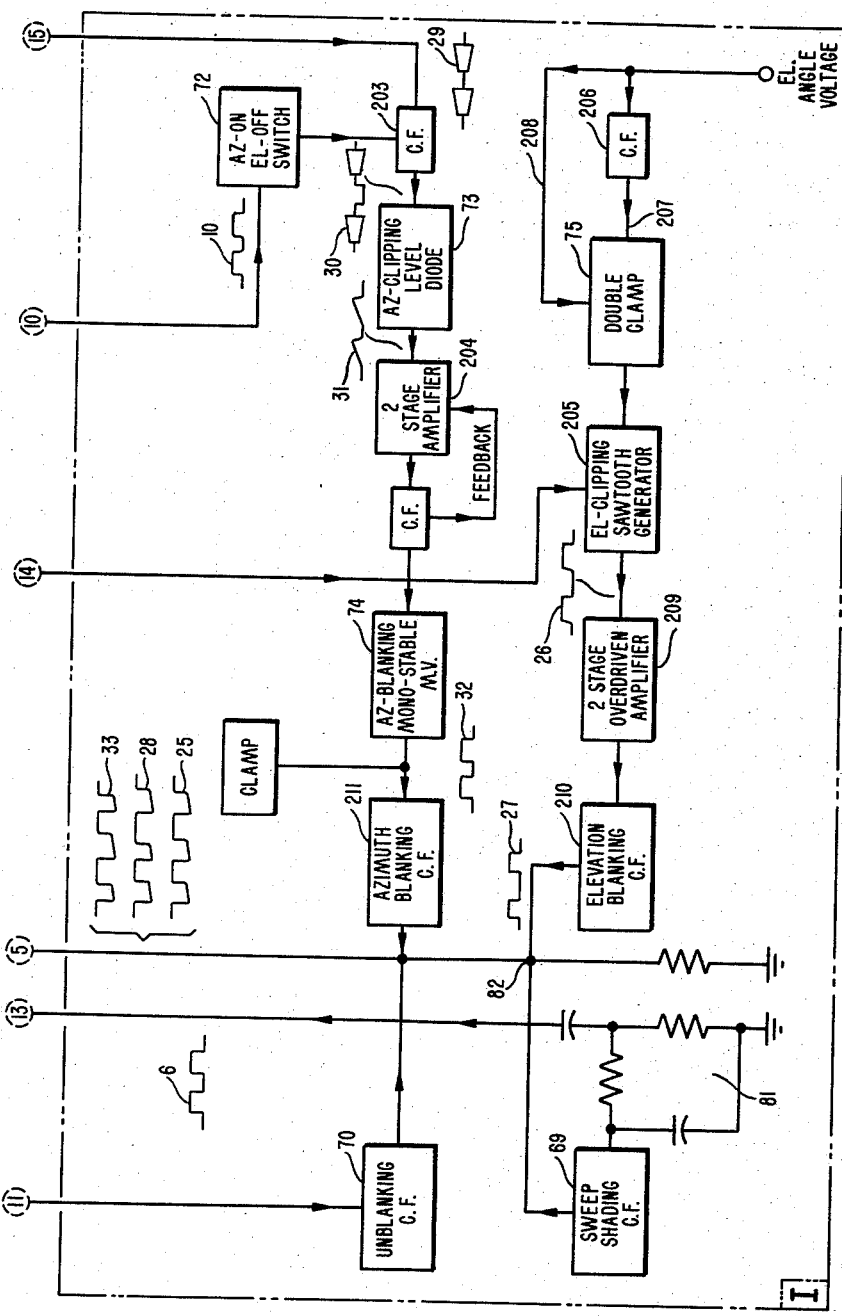

The output of the mixer tubes 100 and 210 is taken across a common load resistor 220 to the vertical sweep amplifier and mixer 61 of FIG. 3a. The output will be a combination of the waveforms 22 and 23.

The sweep generators just described are well adapted to provide the Az and El sectors of a composite display and their operation thereof for this purpose will presently be described. In order to properly present such a display, however, certain additional circuits are required for modifying the indications and further enhancing the utility of the system. Certain of these circuits perform the conventional function of properly clipping and shaping the composite Az—El display. Other circuits are provided which in accordance with the present invention produce an improved operational system having the aforementioned advantages over the systems that have been employed heretofore.

The Blanking Circuits

In order to make the desired portions of the display visible and blank the unwanted or overlapping portions thereof, blanking circuits are provided to control the cathode potential of the cathode-ray tube with appropriate values in the desired sequence. Referring to FIGS. 3C and 3D, the Az and El coincidence sweep gates 7, 8 are applied to a flip-flop 71 which generates the Az-El switch waveforms 9 and 10. The wave 10 is applied by way of a switch 72 (FIG. 3D) to a cathode follower 203 which alternately passes and blocks a signal corresponding to the vertical deflection current 29, thus producing the output waveform 30. The rise of the sweep signal trapezoid of waveform 30 is adjustably selected by a clipping level diode 73 to provide an output waveform 31 which is applied to a two stage amplifier 204 followed by a cathode follower with a feedback connection to the amplifier. The output of this circuit is used to trigger an Az blanking one-shot multivibrator 74, thereby generating gate 32 for blanking the Az display along a horizontal line corresponding to a fixed amplitude of vertical deflection current. This waveform is applied to an Az blanking cathode follower 211.

All of the blanking of the El display occurs when the elevation antenna is scanning the sector of zero degrees to minus one degree and normally no blanking occurs until the sweep range is slightly in excess of one mile. During the time of the El display a negative gate (waveform 8) is applied from the El sweep gate coincidence tube 57 (FIG. 3C) to the input of a clipping sawtooth generator 205 (FIG. 3D), cutting it off. A cathode follower 206 has the elevation angle voltage applied to its grid. Its cathode is coupled to the plate of the sawtooth generator 205 through a double clamp 75 and conductor 207. This clamping action is effective when the generator 205 is conducting, thus tying the level of the base line of its output waveform to the angle voltage. The double clamp 75, by a second conductor 208 connected to the elevation angle voltage input, also acts to limit the sawtooth generated by the sawtooth generator during its cutoff periods to a level slightly more negative than the elevation angle voltage. The output of this generator is illustrated as waveform 26 (FIGS. 3D and 4A), which is below the zero voltage line. This waveform is applied to a two-stage overdriven amplifier 209 (FIG. 3D) and cuts off the second stage of this amplifier for all elevation angle voltage values which occur below zero degrees of elevation movement. Since the baseline of this sawtooth rises with a positively increasing elevation angle voltage, and since this angle voltage increases in a positive sense as the elevation antenna scans in a negative sense, the sawtooth waveform will reach the cut off voltage of the first stage of amplifier 209 at an earlier time with each succeeding elevation sweep as the antenna scans further below ground level. This results in clipping of the elevation display in a sloped line to conform with the slope of the extreme left azimuth antenna scan. The output of this amplifier, shown as waveform 27 (FIGS. 4A and 3D), is applied to an El blanking cathode follower 210, and thence to the point 82.

Intensification Gate Shading and Mixing

The horizontal sweep gate 6 is inverted in amplifier 60 (FIG. 3B) to form intensification wave 18 (FIG. 4A). A portion of wave 6 is combined (FIG. 3D) through a time constant circuit 81 and sweep shading cathode follower 69 with wave 18 which is passed through unblanking cathode follower 70, to form wave 25. This wave has negative beam intensifying portions having a curved positive going shape which tends to decrease the intensity of the electron beam as the range sweep progresses. Since the range sweeps are exponential, the exponentially varying value of beam intensity produces a substantially constant intensity-velocity product for all portions of the sweep, thereby providing a uniformly visible intensity display. The duration of the intensifying gates 25 is modified for portions of the antenna scans where part of the display is to be blanked. Thus, during intervals when El blanking gates 27 are generated, the intensification wave 25 is modified to appear as wave 28 with the El intensification gates variably terminated to obtain the appropriate blanking. Likewise the Az blanking gates 32 variably terminate the Az intensification gates to produce wave 33. The Az and El blanking circuits 210 and 211 supply a common mixing circuit 82 whereby the various potentials are combined for application to the cathode 83 (FIG. 3). The potentials thus applied are waves 25, 28 or 33 (FIG. 4A) depending upon whether the antennas are scanning in a direction for which there is no blanking, only El blanking, or only Az blanking. If the Az and El antennas are not synchronized to scan up and down together on the displays a condition may exist where both Az and El blanking are present for adjacent sweeps.

The Deflection Systems

The deflection systems of the present invention are of the electromagnetic type arranged to provide improved performance contributing to the accuracy and general utility of the Az–El display. For simplicity a fundamental circuit of the type employed is shown in FIG. 5 wherein an air cored deflection coil 91 with shunt damping resistors 90 are connected in the plate circuit of a single-ended deflection amplifier 92 and to the positive terminal of a D.C. source 93. Connected in shunt with the deflection coil 91 and resistors 90 is the serial combination of an adjustable D.C. source 94, an air cored inductor 95 and an adjustable resistor 96. Tube 92 draws a quiescent current from supply 93 through the coil 91 and variations of the tube current in response to opposite polarity signals produce oppositely directed deflection forces. The rest position of the electron beam is adjustable by varying the voltage of source 94. The current thru coil 91 from source 94 is in opposition to the coil current in tube 92 and the resultant deflection force positions the electron beam in accordance with the resultant current therein.

In order to position the electron beam for alternate Az and El sweeps there is provided a vertical spacing tube 64 which switches between two fixed states, one conductive and the other non-conductive, at the end of each vertical sweep gate. The current drawn by the tube 64 traverses the coil 91 producing a component therein corresponding to wave 24. Tube 64 is provided with degenerative cathode resistors 98 returned to a negative supply and with a relatively low screen voltage to ensure that the damping of coil 91 thereby for the two states remains essentially contant. The change in current wave 24 moves the rest position of the beam into the vicinity of the respective origins for the Az and El sweeps at the end of the preceding sweep and hence provides the maximum period for restoration of quiescent conditions before the start of the next sweep.

As hereinbefore explained, complete yoke recovery thru a normal resistive damping circuit is not realizable in any practicable Az—El display with short restoration periods. Furthermore the value of current in the deflection coil will be different as the antenna angle voltage varies and thus the value of current at the end of the restoration period will vary with the angle voltage. This combination of a transient current existing in the deflection coil at the beginning of each sweep which has a value dependent upon the antenna angle voltage produces a phenomenon known as "walking." This phenomenon is characterized by the appearance of the orgins moving up and down with the scanning motion of the respective antennas. Such a motion of the display origins, in addition to producing an influence tending to distract the operator, introduces inaccuracies in the information display near the origin where they can least be tolerated. The circuit of the present invention overcomes the difficulties of this nature heretofore encountered and provides displays which may be readily adjusted to have point origins which are not a function of vertical centering or expansion and are stable in the presence of variations normally encountered in the supply circuits and the like. For this purpose the coil 95 and resistor 96 are provided in the shunt circuit of the deflection coil 91 with preferably a relatively large impedance to avoid the necessity of any appreciable increase in current carrying requirements for the deflection amplifier 92. The time constant of the circuit including the coil 95 and resistor 96 is made approximately equal to the time constant of the deflection coil 91. An air core choke is used for this application in order to maintain constant inductance with varying current. The operation of the restoring circuit just described may be visualized as follows. At the end of each sweep the current in tube 92 drops abruptly to its quiescent value. The combined currents in coils 91 and 95 and in the damping resistors 90 will now try to change in such a manner as to reach an equilibrium value which is a function of this quiescent current. The change of current in the coils 91, 95 occurs, of course, in accordance with the effective time constants in the circuit. Furthermore, in the transient state after the tube current has returned to its quiescent value, the changing currents in the coils 91, 95 are in opposition. By adjustment of the value of resistor 96 the discharge time constant for coil 95 can be established at a value such that the current therefrom exactly cancels the current in coil 91 at a fixed instant of time. Since each succeeding sweep starts at a fixed time after the end of the preceding sweep, the recovery time is constant and with proper adjustment of resistor 96 each sweep starts with a zero valued A.C. component of expansion force. Fluctuations in the amplitude of the vertical expansion currents apply as equal factors to both coils 91, 95 and the cancellation condition obtains irrespective of the magnitude thereof so long as the circuit remains substantially linear.

The deflection system of the present invention incorporates, as shown in FIG. 6, horizontal and vertical deflection arrangements having the features described with reference to FIG. 5, the components related to the horizontal deflection arrangement being identified by primed reference characters corresponding to the reference characters identifying the corresponding elements of the vertical arrangement. The variable source indicated as 94 in FIG. 5 is here amplified into a single voltage source 97 with vertical and horizontal regulator circuits 94 and 94', respectively.

*The Cursor and Wave-Off Line Generators*

Figure 7:
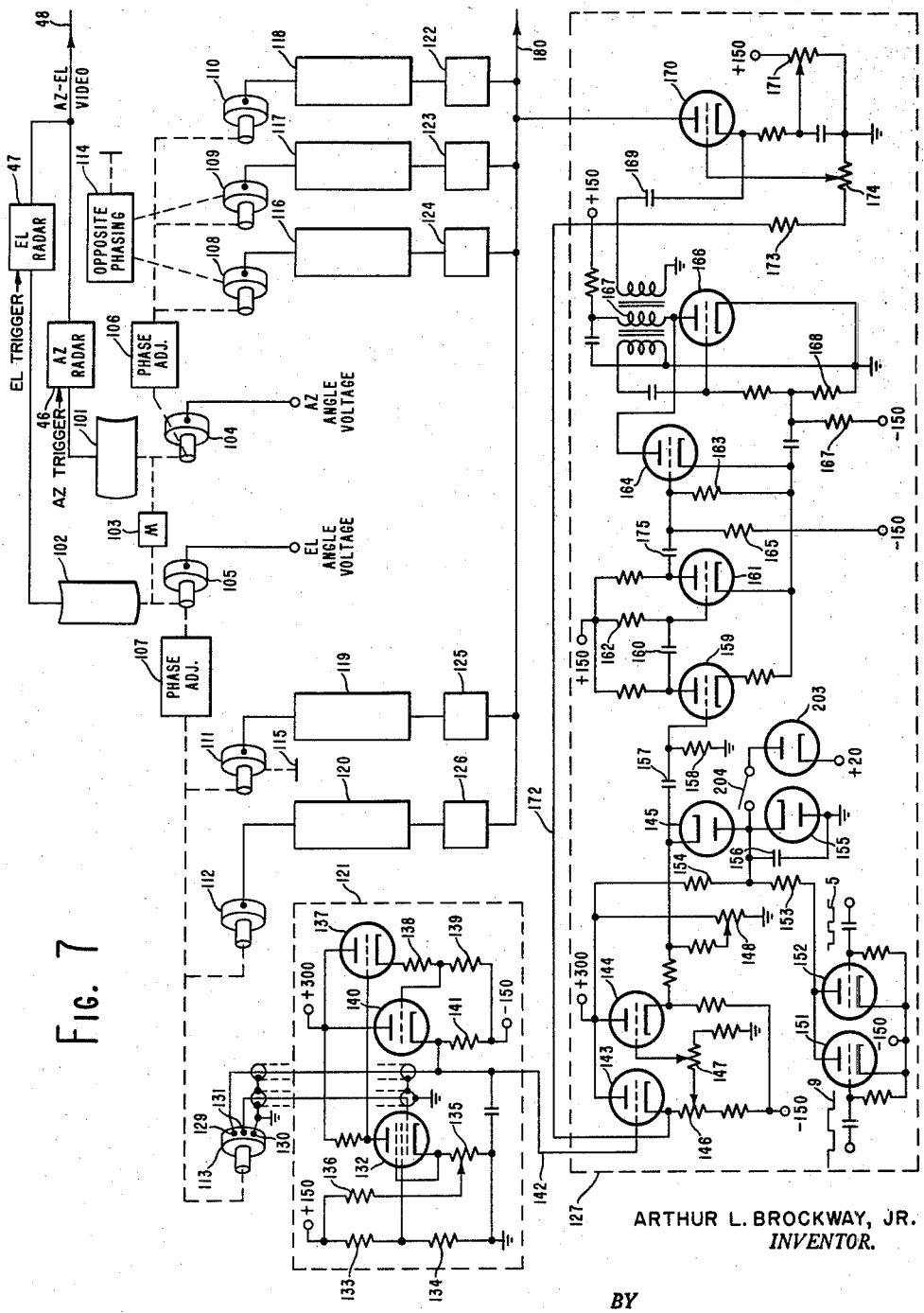
FIGS. 7 and 7A are schematic circuit diagrams of the cursor and wave-off line generating portions of the system of FIGS. 2 and 3.

The electronic lines on the respective displays are generated with respect to the scanning positions of Az antenna 101 and El antenna 102 as shown in FIGS. 3, 3A and 7. These antennas scan limited sectors of space in a manner well known in GCA systems as described, for example, in U.S. Patent No. 2,555,101 to Alvarez et al. Referring to FIG. 7, the antennas are driven in scanning motion by a motor means 103 which drives the two antennas 101, 102 to scan their respective sectors in synchronism such that they each reach the end of the scan motion simultaneously. A signal representative of antenna scan position is obtained by suitable means, as Az angle voltage potentiometer 104 connected to Az antenna 101 and El angle voltage potentiometer 105 connected to El antenna 102. The motion transmitted to potentiometers 104, 105 is transmitted by mechanical phase shifters 106, 107 to drive sets of three potentiometers 108, 109, 110; and 111, 112, 113. In the Az system, potentiometers 108, 109 are phased equally and in opposite directions to the position of potentiometer 110 by means of opposite phasing means 114. In the El system potentiometer 111 is angularly adjustable relative to potentiometers 112, 113 by adjusting means 115. As also seen in FIG. 3A, voltages from the potentiometers 108-113 are supplied to inverse function generators 116, 117, 118, 119, 120, 121 of the type disclosed in copending application Serial No. 247,046, filed September 18, 1951, now U.S. Patent 2,718,591 to W. R. Hedeman, Jr. The voltage output of the function generators 116—121 is applied to control delay pulse generators 122, 123, 124, 125, 126, 127 which supply accurately timed intensification pulses to the cathode-ray indicator via a video output circuit 128 of FIG. 7a, to which reference will later be made. The theory and operation of the function generator and pulse delay circuits will be explained presently. The intensification pulses when applied to the video amplifier are mixed with the video input and the range mark signals, and the resulting composite signal is applied to the control grid 84 of the CR tube. The aggregate of the intensification pulses produces the cursor and wave-off line indications on the display.

Figure 8:
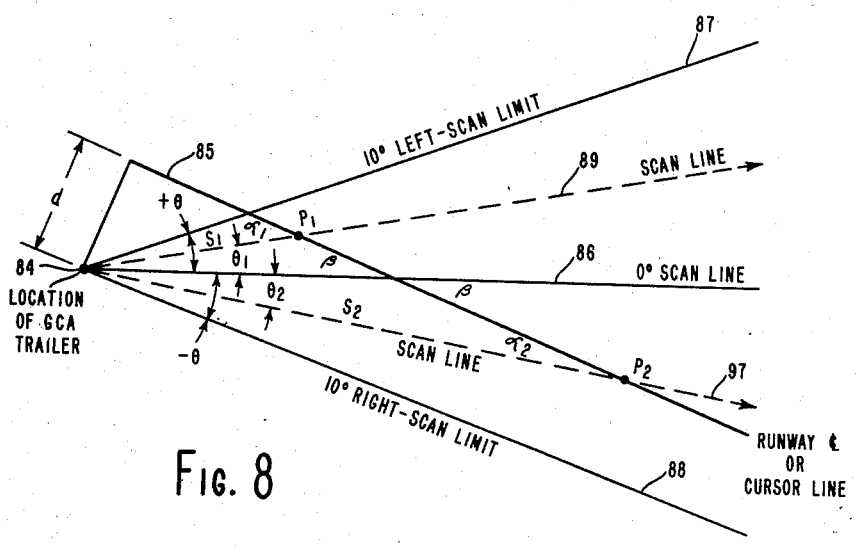
FIG. 8 is a diagram showing the trigonometric relationships existing between a GCA system positioned close to a runway, the center line of the runway and the azimuth antenna scanning pattern.

Before an explanation is given of the circuit used to develop the electronic cursor and wave-off lines it is desirable to understand the manner in which these lines may be made to simulate straight lines in space. There is shown in FIG. 8 a diagram of the relationships existing between the runway center line and the scan lines of the Az antenna with the GCA trailer positioned to the left of the runway as seen from an approaching aircraft.

The location of the trailer is indicated at 84. It is separated from the center line 85 of the runway by a distance $d$. The line 86 represents the center line of the scan pattern of the Az antenna and the lines 87 and 88 represent the limits of scan. The lines 89 and 97 indicate intermediate positions of scan. The distance in space from the antenna to the intersection of the runway center line and the line of antenna scan is represented by S.

It is desired to generate a display on which the line 85 will be formed by dots of beam intensification with one dot being formed during each sweep. On the display the point of origin will correspond to point 84 and the time delay between the start of each sweep and the intensification impulse of that sweep must be in proportion to the distance S for the scan position then existing.

Thus the Az cursor potentiometer 110 (FIG. 7) must have its resistance so proportioned that a voltage proportional to the movement of its slider, as generated by the inverse function generator 118, will, when applied to the control delay pulse generator 122, generate control pulses delayed by such times that a straight line corresponding to 85, made up of dots of intensification, will result.

A formula for the proportioning of the resistance of the potentiometer 110 can be developed from the trigonometric relationships of the diagram of FIG. 8. The angle $\beta$ represents the angle formed by the zero degrees scan line 86 and the cursor line or runway center line 85. The angle $\theta$ represents the angle formed by the intersection of the 0° scan line 86 and the line of scan at any given instant, such as the line 89. The angle $\alpha$ represents the angle formed by the intersection of the line of scan at any given instant, such as 89, and the projected runway center line 85.

The dimension S and the angle $\alpha$ vary as a function of antenna scan for any fixed position of the GCA trailer. It can be seen that a right triangle is formed by the side $d$, the side S and the segment of the runway center line intersected by sides $d$ and S. The instantaneous value of S establishes the radar range at which the cursor line spot should appear on the display for each sweep and the side S corresponds to the sweep trace.

The radar range $S_1$ from the origin to the point $P_1$ can be expressed by the equation $$S_1 = \frac{d}{\sin \alpha_1}$$

Since $\alpha_1 = \beta + \theta_1$, by substitution the equation $$S_1 = \frac{d}{\sin (\beta + \theta_1)}$$

may be derived. With respect to point $P_2$, there may be derived in the same manner the equation $$S_2 = \frac{d}{\sin (\beta - \theta_2)}$$

If $\theta$ is considered to be positive when the antenna scans from zero degress to ten degrees left as seen from behind the antenna, and negative when it scans from zero degrees to ten degrees right, the two equations derived above may be combined in the equation $$S = \frac{d}{\sin (\beta + \theta)}$$

The sin functions of $(\beta + \theta)$ can be eliminated by substituting the quantity $(\beta - \theta)$ expressed in radians, without objectionable error, since the angles are small.

Since in radar, range is a linear function of time, an equation can be developed which will express S in terms of time or time delay between the transmitted pulse and the return echo. This is the equation $S = AT$ where A is a constant equal to 492 feet per micro-second. By substitution the equation $$T = \frac{d}{A(\beta + \theta)}$$

is derived. This value of time delay determines where in the azimuth display each intensity modulated cursor spot should appear. It is the function of the delay pulse generators 122 to 127 to supply time delays for the various cursor and wave-off lines and the delay pulse generator 122 performs this function for the Az cursor. The time delay generated by these circuits varies linearly with the input voltage applied thereto by the inverse function generators 116 to 121.

The time delay generated by any of the delay pulse generators may be expressed by the equation $T = VDH$ where D is a constant representing the slope of the linear time delay circuit curve expressed in micro-seconds per volt, with H equal to 1. The constant H is a control, functioning as a multiplying factor of D. Solving for V, the voltage applied to the time delay circuit, the equation $$V = \frac{T}{DH}$$

is derived. This equation may be substituted into the equation $$T = \frac{d}{A(\beta + \theta)}$$

to obtain the equation $$V = \frac{d}{DAH(\beta + \theta)}$$

This is the voltage required by the time delay circuit 122 to produce cursor generating pulses.

A diagram of trigonometric relationships similar to that of FIG. 8 may be drawn up for right of runway operation and equations similar to those above may be derived by the same methods. An equation $$V = \frac{d}{DAH(\beta - \theta)}$$

will be obtained for the voltage to be supplied to the time delay circuit 122 under these circumstances.

For determining the voltage to be applied to the E$l$ cursor time delay circuit 127 diagram of trigonometric relationships similar to FIG. 8 may be drawn and equations derived in the same manner. It will be found that the voltage may be expressed by the equation $$V = \frac{d \sin \beta}{DAH(\beta - \theta)}$$

where $d$ is now the distance on the ground from the trailer to the touchdown point and $\beta$ is the angle between the glide path and the ground plane.

The method of determining the voltage to be applied to the time delay circuits for the wave-off lines of the Az display is similar to that followed above. For left of runway operation the No. 1 wave-off line slopes to the left of the runway at a rate of, for example, 200 feet per mile. The equation $$V = \frac{d}{DAH(\beta + \theta)}$$

developed for the Az cursor line may be used, the only difference being a smaller value of $d$, and to achieve the required slope, $\beta$ is replaced by $(\beta - 1.9$ degrees$)$. This line would be called the No. 2 wave-off line in right of runway operation.

The No. 2 Az wave-off line in left of runway operation will utilize the equation $$V = \frac{d}{DAH(\beta - \theta)}$$

a larger $d$ being employed and $\beta$ being replaced by the quantity $(\beta + 1.9$ degrees$)$.

The No. 1 elevation wave-off line is a straight line in space, parallel to and, for example, fifty feet above, the E$l$ cursor line, intersecting the ground line at a distance $d$ from the GCA trailer. Thus, for example, the equation $$V = \frac{d \sin \beta}{DAH(\beta - \theta)}$$

developed for the E$l$ cursor line, can be applied to the E$l$ No. 1 wave-off line, the only difference being a smaller value of $(d)$. That is, this wave-off line intersects the ground line at a point closer to the trailer than does the E$l$ cursor line.

The No. 2 wave-off line is a straight line in space, intersecting the ground line at a distance $d$ from the trailer, intersecting the E$l$ cursor line at a point over the end of the runway, and sloping down from the E$l$ cursor line at a rate of approximately fifty feet per mile. To achieve this slope the No. 2 wave-off line must intersect the ground line at an angle of $\beta - .48$ degrees. The equation $$V = \frac{d \sin \beta}{DAH(\beta - \theta)}$$

developed for the E$l$ cursor line may be applied to the E$l$ No. 2 wave-off line, the only difference being smaller values of both $d$ and $\beta$.

The voltages V referred to above are developed by the inverse function generators 116 to 121 (FIG. 7) in response to the positioning of the potentiometers 108 to 113. The potentiometers are linear and are driven from the respective antennas through gearing which provides approximately 240° of potentiometer slider travel for each complete scan movement of the antenna.

FIG. 9 is a graph showing a curve of resistance of one of the potentiometers, which may be taken to be the Az cursor potentiometer 110 for left of runway operation. It also shows a curve of voltage output of the resistor. FIG. 9a is a simplified schematic of the same potentiometer 110 having end terminals 129 and 130 and a slider 131. The resistance between the end terminals is indicated by R and that between the slider and terminal 129 as r. The output voltage of the potentiometer is indicated by $V_1$.

FIG. 9 is a graph of r over the range of potentiometer rotation which is indicated as $\phi$. As can be seen from the drawing, the resistance r remains constant as the potentiometer rotates from 2.5° to 49°, then increases linearly as rotation continues from 49° to 207°. From 207° of rotation to 357.5° the resistance r remains constant at 30,000 ohms. To produce such a curve, the resistance card of the potentiometer is shorted out over the ranges 2.5°–49° and 207°–357.5°. The points 49° and 207° mark the limits of cursor line development.

It can be seen that r varies linearly with $\theta$ since $\varphi$ is a linear function of $\theta$. This relationship can be expressed as $r = F\theta + C$. The constant F represents the slope of the resistance antenna scan angle curve of the cursor potentiometer. The constant C represents the value of r when the antenna scan angle is equal to zero degrees. To solve for the constants F and C substitution may be employed. Considering the range of antenna scan between potentiometer positions at 49° and 207° to be 17.3° we can substitute for point X, $$r = 0, \theta = -\beta + 17.3°$$

and for point Y, $r = R$ and $\theta = -\beta$. Solving these two equations in F and C simultaneously, $$F = \frac{-R}{17.3} \text{ and } C = R\left(1 - \frac{\beta}{17.3}\right)$$

The value of r can be determined by the equation $$r = \frac{-R\theta}{17.3} + R\left(1 - \frac{\beta}{17.3}\right)$$

with both $\beta$ and $\theta$ expressed in degrees. It can be seen from FIG. 9a that $$e = V_1 \frac{R-r}{R}$$

Solving for $V_1$ in this equation, the equation $$V_1 = \frac{eR}{R-r}$$

is developed. Substituting the value of r expressed as a function of $\theta$ and $\beta$ (in degrees) the equation $$V_1 = \frac{eR}{R - \frac{-R\theta}{17.3} - R\left(1 - \frac{\beta}{17.3}\right)}$$

is developed. This equation reduces to $$V_1 = \frac{.302e}{(\beta + \theta)}$$

where $\beta$ and $\theta$ are expressed in radians. This is the equation of the output voltage of the potentiometer as a function of $\theta$ and $\beta$. The previously developed equation $$V = \frac{d}{DAH(\beta + \theta)}$$

represented the voltage required by the time delay circuit to produce the required cursor generating pulses. If it is assumed that $V_1 = V$ the two equations can be combined and solved for d. By so doing the equation $d = .302$ HDAe is produced.

It can be seen that, in order to make d constant for any given situation, the necessary circuit requirement will be that e, the voltage on the area of the potentiometer, be held constant. This is accomplished by the inverse function generators in a manner which will be explained.

In order to shift from left of runway to right of runway operation the same cursor potentiometer is used but the direction of its rotation is reversed with reference to antenna motion. Also, since it is assumed that the 0° scan line always crosses the runway in front of the antenna and that the antenna scan angle was $-\beta$ degrees when the cursor terminated (at theoretically infinite range) in left of runway operation, and is $+\beta$ degrees for right of runway operation, the phasing of the potentiometer must be changed by twice the angle of $\beta$.

Since the Az wave-off lines are symmetrical with respect to the Az cursor line, it is also necessary to reverse the rotation of their respective potentiometers and phase them by $2\beta$ when such a shift is made. When shifting runway sides the identity of the two Az wave-off lines is reversed since the reversal in potentiometer rotations is not accompanied by a similar reversal in phase relationships between the cursor and wave-off potentiometers.

The potentiometer for the El cursor line and the El wave-off lines are of similar construction to those related to the Az display. In all cases the voltage e on the potentiometer arm must be held constant as the slider moves.

FIG. 7 shows a schematic circuit diagram of one of the inverse function generators, the one selected being the generator 121, associated with the El cursor potentiometer 113. The configuration of this potentiometer is similar to that shown in FIG. 9a, the same terminals 129, 130 and 131 being present.

The circuit comprises a pentode 132 which acts as an amplifier. Voltage from a 150 volt source is applied to the screen grid by way of a voltage divider composed of resistors 133 and 134 and to the slider of a potentiometer 135 in the cathode circuit through a resistor 136. The anode is directly connected to the control grid of a cathode follower 137, the cathode of which is connected to the negative terminal of the 150 volt source through a pair of resistors 138, 139. The junction joint of these resistors is connected to the control grid of a second cathode follower 140, the cathode of which is returned to the negative terminal of the 150 volt source through a resistor 141. The terminal 129 of the potentiometer 113 is connected to the cathode of tube 140 and the slider 131 is connected to the grid of tube 132. The output voltage $V_1$ of the circuit is taken from the terminal 129 and applied to the circuit 127.

In the operation of this circuit it is desired that the output voltage $V_1$ vary inversely with the angle $\theta$, and as discussed above, that the voltage e on the slider 131 be held constant throughout the portion of the excursion of $\theta$ for which a cursor is required. The circuit shown will maintain a substantially constant value of e, provided the gain thereof is infinite.

Assume that the value of e is two volts positive. As the slider moves toward the terminal 130, in order to maintain a constant value of e, the voltage across the potentiometer must increase. For example, if the slider is at the terminal 129, and the voltage from the slider to ground is two volts, the voltage across the potentiometer must be two volts. If the slider is at the mid-point of the resistance winding, and if its value is 30,000 ohms, in order for e to remain constant at two volts, the voltage across the potentiometer must have risen to four volts. When the arm of the potentiometer reaches 22,500 ohms the voltage across the potentiometer must have risen to eight volts.

Any tendency for the voltage on the arm of the potentiometer to decrease will cause the output voltage of the amplifier 132 to rise rapidly. This voltage rise will be reflected by the two cathode followers 137, 140 and will result in a rising voltage at terminal 129 of the potentiometer. The purpose of the cathode followers is to act as buffers between a voltage divider, which drops the plate voltage of amplifier 132 down to a voltage which approximates the desired value of $e$, the plate of 132, and the output terminal 129 of the potentiometer. Also the cathode follower output stage 140 provides a low impedance output for the voltage $V_1$. Considering the loop gain to be infinite, any change, or tendency to change, in the voltage $e$, will result in a change of $V_1$ which will compensate completely for this change in $e$, in such a manner as to return $e$ to its original value. Of course the loop gain is not truly infinite, but operates within limits. Actually the gain of this circuit is adjusted to that value less than infinity which, in the practical radar system, compensates for the other than theoretically linear delay of the delay pulse generator 127. The value of $e$ is set by the potentiometer 135.

The output voltage $V_1$ of the inverse function generator 121 is applied to the delay pulse generator 127 by conductor 142. The voltage is applied to the control grid of a D.C. cathode follower 143. The purpose of this cathode follower is to isolate the delay pulse generator from the inverse function generator. Its output is applied to a second cathode follower 144.

The D.C. output of cathode follower 144 is applied to the cathode of a pick-off diode 145.

A potentiometer 146 is provided in the cathode circuit of cathode follower 143. The function of this potentiometer is to make the output voltage of the cathode follower 143 zero volts when zero volts is applied to its control grid. The arm of this potentiometer is connected to ground through a second potentiometer 147. This potentiometer provides the factor H in the cursor line theory developed above. The arm of this potentiometer couples the output of cathode follower 143 to the control grid of cathode follower 144. A third potentiometer 148 is made up of a resistor connected between the anode supply terminal and ground and its arm connected to the cathode of pick-off diode 145. Its purpose is to adjust the cathode voltage of tube 144 so that with zero volts input to tube 143 the cursor pulse will appear coincident in time with the E$l$ transmitted pulse.

A pair of triodes 151 and 152 have their cathodes connected to the negative terminal of the 150 volt source and their anodes coupled to the anode of the pick-off diode 145. The tube 151 is termed the Az—E$l$ switch tube and the tube 152 is called the cursor sawtooth generator. The waveform 9 of FIG. 4 is applied to the grid of tube 151 and the waveform 5 is applied to the grid of tube 152.

During the time of an azimuth sweep tube 151 is conducting heavily and the voltage at the junction of the plate load resistors 153, 154 is zero volts. This junction is clamped to zero volts by a clamping diode 155 having its cathode connected to the junction and to the anode of pick-off diode 145. A condenser 156 is connected between cathode and anode of diode 155 and the anode is grounded. The charge on this condenser is zero volts during the azimuth sweep.

At the end of this sweep (approximately 65 microseconds before the E$l$ pre-trigger) the negative 208 microseconds E$l$—On switch 9 is coupled to the control grid of Az—E$l$ switch tube 151, cutting off this stage. However, the conduction of the cursor sawtooth generator 152 is sufficient to keep the junction of resistors 153, 154 at ground potential. When the E$l$ pre-trigger occurs, a negative gate approximately 143 microsceonds long, of waveform 5 is coupled from inverter 68 (FIG. 3) to the control grid of the cursor sawtooth generator 152, cutting off this stage.

When both stages 151 and 152 are cut off condenser 156 begins to charge towards +300 volts, at a time coincident with the E$l$ pre-trigger producing the waveform 12 (FIG. 4). The sawtooth repetition rate is 2400 cycles per second and it has a slope of approximately .6 volt per microsecond. Since a condenser charges exponentially, the maximum voltage that is reached in approximately 143 microseconds is around 75 volts. Assume that the cathode potential of pick-off diode 145 has reached 30 volts positive. When the sawtooth waveform on the plate of the pick-off diode reaches this value, the pick-off diode conducts and a sawtooth waveform 13 appears on its cathode. Under the conditions assumed this would occur approximately 30 microseconds after the transmitted pulse, corresponding to a range of about two and one-half miles.

This waveform is coupled through a differentiating circuit consisting of a condenser 157 and a grounded resistor 158 to the control grid of a sawtooth shaping amplifier tube 159, the waveform at this grid being shown as 13A (FIG. 4). The purpose of this stage is to increase the rise time of the applied sawtooth. Its negative output is coupled from its anode by a condenser 160 to the control grid of a second sawtooth shaping amplifier tube 161, which has its control grid returned to +150 volts through a resistor 162. The purpose of this stage is to increase the rise time of the applied waveform still further, to a point where it very nearly resembles a square wave.

The positive output is coupled through a differentiating circuit consisting of a condenser 175 and a grounded resistor 163 to the control grid of an isolating amplifier tube 164. This stage is held below cut-off by a biasing arrangement consisting of a resistor 165 connected between its control grid and the negative terminal of the 150 volt source. The resistors 163 and 165 act as a voltage divider between −150 volts and ground.

The positive spike of the differentiated input waveform causes this tube to conduct, developing a sharp negative pulse on its anode. This negative pulse is coupled directly to the anode of a blocking oscillator 166. The control grid of this tube is connected to a voltage divider comprising the resistors 167 and 168 connected between −150 volts and ground. The resulting bias holds the blocking oscillator below cut-off. The negative spike of isolation amplifier 164 is coupled directly to the plate of this oscillator. This pulse is coupled through a conventional blocking oscillator transformer 167, appearing as a positive pulse on the control grid and initiating typical blocking oscillator action.

The output of the blocking oscillator taken from the transformer is a sharp negative pulse, approximately twenty volts in amplitude and .25 microseconds long shown in wave form 14 (FIG. 4). This pulse is coupled through a condenser 169 to the cathode of a cursor intensity control tube 170. The tube is normally held below cut-off by cathode bias developed across a potentiometer 171 connected between the positive terminal of the 150 volt source and ground. Coupled to the control grid of this stage is a portion of the input voltage to the circuit 127, taken from the cathode of tube 143 by conductor 172 and the serially connected resistor 173 and potentiometer 174; the arm of the potentiometer being connected to the grid. The purpose of this voltage is to maintain even cursor line intensity throughout the ten miles of sweep range, since near the maximum range the rate of change, in distance, of the cursor spots is much greater than it is at the lower ranges. For this reason, as the time delay of the cursor pulse increases, the output amplitude of the cursor intensity control tube 170 is increased by the effect of the increasing level of the voltage taken from the cathode of D.C. cathode follower 143. The negative cursor pulse output of the tube 170 is coupled directly to the video output circuit by a conductor 180. The delay pulse generator circuit 122 for the Az cursor, operates in the same manner, its Az E$l$ switch tube having applied to it the waveform 10 rather than 9. The same is true of the Az and E$l$ wave-off line pulse generators, the Az circuits having waveform 10 applied to their Az—E$l$ switch tubes and the E$l$ circuits utilizing waveform 9.

The wave-off lines are terminated at a three mile range rather than the ten mile limit of the cursor lines.

This is accomplished by a limiting diode 203 which appears only in the delay pulse generator circuits of the wave-off lines but has for convenience been shown in the circuit of FIG. 7 separated from the cathode of tube 155 by a switch 204.

Video Output Circuit

Figure 7A:
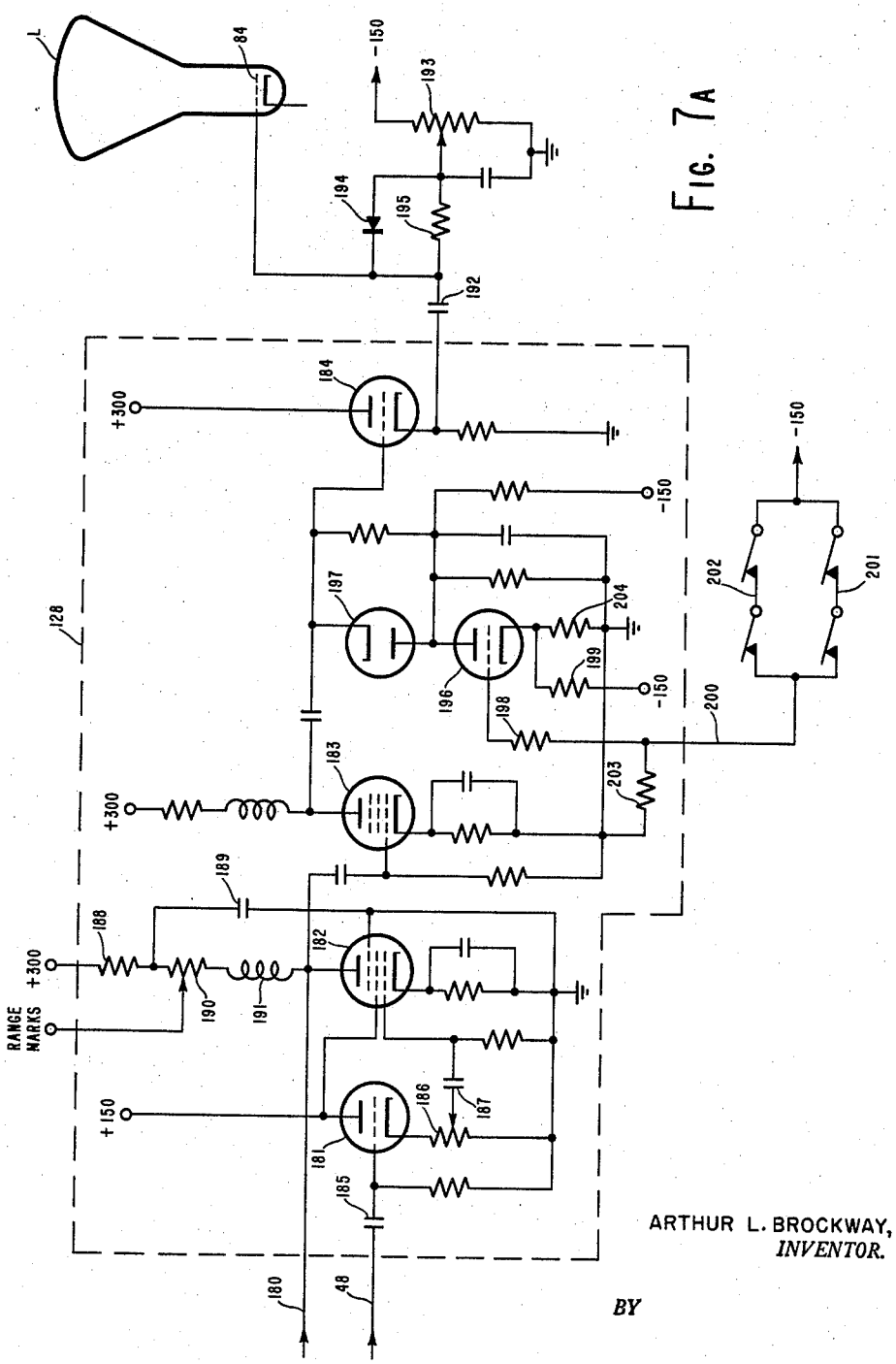

This circuit is illustrated in FIG. 7A, being designated as the circuitry within the dashed box 128. It comprises an input cathode follower tube 181, a first video amplifier tube 182, a second video amplifier tube 183 and a video output cathode follower 184 connected in cascade.

The video outputs from the Az radar 46 and the El radar 47 shown on FIG. 7 are combined and applied to the video output circuit by way of conductor 48. This signal is coupled by a condenser 185 to the control grid of input cathode follower 181. A gain controlling potentiometer 186 is located in the cathode circuit of this tube. The output of this stage, from the arm of this potentiometer, is coupled to the control grid of the first viedo amplifier 182, by way of a condenser 187. This video signal, known as the target video, is mixed in the plate circuit of this stage with the Az and El cursor and wave-off line voltages and with the range mark voltage, having a form shown as waveform 17. The latter voltage is produced in a known manner in range mark circuits D.

The positive target video signal, referred to above, is amplified and inverted, and appears in the anode circuit of tube 182 as a negative signal. The negative pulse outputs of all the cursor line and wave-off line intensity control tubes are applied directly to the anode of this stage by conductor 180. The plate load of this tube consists of serially connected resistor 190 and an inductor 191. The resistor 190 is a potentiometer, to the arm of which are applied negative range mark signals generated in the range mark circuits in block D of FIGS. 2 and 3.

Thus, appearing on the anode of this stage is a negative composite video signal consisting of target video, range mark pulses, cursor line pulses and wave-off line pulses. The inductor 191 is included to improve the high frequency response of this stage. The video signal is capacity coupled to the second video amplifier 183 and the output of this stage is capacity coupled to the control grid of the video output cathode follower 184.

The positive video output of this stage is coupled through a condenser 192 to the control grid 84 of the Az—El CRT. The control grid bias of this tube is adjusted by an intensity potentiometer 193 connected between the negative terminal of the 150 volt supply and ground. Thus the positive video signal applied to the CRT is superimposed upon a negative baseline. A clamping rectifier 194 connected between the control grid and the arm of potentiometer 193 across a resistor 195, prevents the control grid from going more negative than the arm.

Forming a part of the video output circuit is a video disabling circuit comprising a triode 196 and a diode 197. The anodes of the two tubes are directly connected, the cathode of the diode being directly connected to the control grid of tube 184 and that of the triode being connected to the junction of resistor 199 and 204. The voltage here is approximately −135 volts. The triode acts as a video disabling tube. During the time that both the Az and El antennas are within their respective scan limits, voltage from the negative terminal of the 150 volt source is applied to the control grid of the disabling tube keeping it cut off. This voltage is applied through a conductor 200 extending between the control grid of tube 196 and the negative terminal of the 150 volt source. This conductor has a pair of parallel branches 201 and 202, each including a serial arrangement of two switches. The switches are limit switches, normally closed and openable by the Az and El antennas at the limits of their scan, those in each branch being operated by a respective one of the antennas.

The control grid of tube 196 is also coupled to ground by way of a serially connected pair of resistors 198 and 203, the junction being connected to the conductor 200 from the limit switches.

When both antennas reach an over travel position thus interrupting both branches 201 and 202, the −150 volt bias is removed from tube 196 and it conducts heavily, placing the control grid of the video output cathode follower at about −75 volts and cutting it off regardless of the amplitude of the applied signal.

The foregoing detailed description of circuitry does not cover certain components of the system which are disclosed in FIGS. 2, 3, 3A, 3B, 3C and 3D in the form of boxes. These portions of the system are, however, of conventional construction and their detailed description is, accordingly, considered unnecessary.

While various values of electrical components and quantities, as well as distances, angles and other geometric quantities have been given in the explanation of the preferred embodiment of the invention, it should be understood that these are given only by way of example and do not limit the invention.

What is claimed is:

1. Means for generating on the screen of a cathode ray tube a display representative of a region in space scanned by a beam of energy emitted by a radio pulse echo system, including a representation of a line lying within said region of space, said means comprising: means deriving from the scan of said beam an angle voltage the instantaneous magnitude of which is representative of the orientation of said beam within its scanning pattern, means causing the cathode beam of said tube to sweep repetitively across said screen in synchronism with the transmission of the pulses of said system, said sweeps having an orientation with respect to a reference point on said screen which is representative of the scan of said beam, means deriving from the scan of said beam a second angle voltage whose amplitude varies inversely as the scan angle from a reference position, said voltage being proportioned to the distance to said line in space, means generating a train of pulses whose time delays from respective output pulses of energy emitted by said pulse echo system vary directly with the amplitude of said second angle voltage, means applying said train of pulses to intensity modulate the cathode ray tube and thereby produce on said display a true representation of said line lying within said region of space.

2. Means for electronically generating a visible line on a display on the screen of a cathode ray tube, said display being of the type in which the cathode beam of said tube is repetitively swept across said screen along paths which have a progressive orientation with respect to a reference point on said screen, said means comprising: means generating a voltage the instantaneous magnitude of which is a measure of the distance between said point and the intersection of said line with the concurrent path of said cathode beam, a sawtooth voltage generator comprising a capacitor, means repetitively applying a constant charging voltage across said capacitor in synchronism with said sweeps of said cathode beam, a unilateral impedance means serially connected to said capacitor, means applying said generated voltage across said unilateral impedance means and said capacitor, said generated and charging voltages being applied in the same sense with respect to said capacitor and said unilateral impedance means being polarized to conduct when the magnitude of the charge on said capacitor exceeds that of said generated voltage, means responsive to the voltage appearing across said unilateral impedance means and said capacitor to generate a voltage pulse at the instant said unilateral impedance means conducts and means applying said voltage pulse to said cathode ray tube to intensify said cathode beam.

3. Means for generating on the screen of a cathode ray tube a display representative of a region in space scanned by a beam of energy emitted by a radio pulse echo system, including a representation of a line lying within said region of space, said means comprising means deriving from the scan of said beam an angle voltage the instantaneous magnitude of which is representative of the orientation of said beam within its scanning pattern, means causing the cathode beam of said tube to sweep repetitively across said screen in synchronism with the transmission of the pulses of said system, said sweeps having an orientation with respect to a reference point on said screen which is representative of the scan of said beam, means deriving from said scan a delay voltage the instantaneous magnitude of which is a measure of the instantaneous distance between the origin of said beam of energy and the intersection of said beam of energy with said line, a sawtooth generator comprising a capacitor, means repetitively applying a constant charging voltage across said capacitor in synchronism with said sweeps of said cathode beam, a unilateral impedance means serially connected to said capacitor, means applying said delay voltage across said unilateral impedance means and said capacitor, said delay and charging voltages being applied in the same sense with respect to said capacitor and said unilateral impedance means being polarized to conduct when the magnitude of the charge on said capacitor exceeds the magnitude of said delay voltage, means responsive to the voltage appearing across said unilateral impedance means and said capacitor to generate a voltage pulse at the instant said unilateral impedance means conducts and means applying said voltage pulse to said cathode ray tube to intensify said cathode beam.

4. Means for electronically generating a visible line on a display on the screen of a cathode ray tube, said display being of the type in which the cathode beam of said tube is repetitively swept across said screen along paths which have a progressive orientation with respect to a reference point on said screen, said means comprising: means generating a voltage the instantaneous magnitude of which is a measure of the distance between said point and the intersection of said line with the concurrent path of said cathode beam, a sawtooth voltage generator generating in synchronism with the sweep of said cathode beam a sawtooth voltage having a constant amplitude, a unilateral impedance means, means applying the output of said sawtooth voltage generator to one terminal of said unilateral impedance means and said generated voltage to the other terminal thereof, said generated voltage and the said output of said sawtooth voltage generator having the same sense, and said unilateral impedance means being polarized to conduct when the magnitude of the output of said sawtooth voltage generator exceeds that of said generated voltage, means responsive to the voltage appearing at said other terminal of said unilateral impedance means to generate a voltage pulse at the instant said unilateral impedance means conducts and means applying said voltage pulse to said cathode ray tube to intensify said cathode beam.

5. In a two coordinate radar system, means for electronically generating a visible line on a display on the screen of a cathode ray tube simulating a plane in that portion of space scanned by said system, said display being of the type in which the cathode beam of said tube is repetitively swept across said screen, said means comprising: means generating a voltage the instantaneous magnitude of which is a measure of the distance between the radiating element of said system and the intersection of the radar beam with the said plane, a sawtooth voltage generator generating in synchronism with the pulses of energy emitted by said system a sawtooth voltage having a constant amplitude, means comparing said sawtooth voltage and said generated voltage and generating a voltage pulse at the instant the magnitude of the leading edge of each excursion of said sawtooth voltage bears a predetermined relationship to the magnitude of said generated voltage, and means applying said voltage pulses to said cathode ray tube to intensify said cathode beam.

6. Means for generating on the screen of a cathode ray tube a display representative of a region in space scanned by a beam of energy emitted by a radio pulse echo system, including a representation of a line lying within said region of space, said means comprising means driving from the scan of said beam an angle voltage the instantaneous magnitude of which is representative of the orientation of said beam within its scanning pattern, means causing the cathode beam of said tube to sweep repetitively across said screen in synchronism with the transmission of the pulses of said system, said sweeps having an orientation with respect to a reference point on said screen which is representative of the scan of said beam of energy, means deriving from said scan a delay voltage the instantaneous magnitude of which is a measure of the instantaneous distance between the origin of said beam of energy and the intersection of said beam of energy with said line, a sawtooth voltage generator generating in synchronism with the sweep of said cathode beam a sawtooth voltage waveform having a constant amplitude, a unilateral impedance means, means applying the output of said sawtooth voltage generator to one terminal of said unilateral impedance means and said delay voltage to the other terminal thereof, said delay voltage and the said output of said sawtooth voltage generator having the same sense, and said unilateral impedance means being polarized to conduct when the magnitude of the output of said sawtooth voltage generator exceeds that of said delay voltage, means responsive to the voltage appearing at said other terminal of said unilateral impedance means to generate a voltage pulse at the instant said unilateral impedance means conducts and means applying said voltage pulse to said cathode ray tube to intensify said cathode beam.

7. Means for generating on the screen of a cathode ray tube a display representative of a region in space scanned by a beam of energy emitted by a radio pulse echo system, including a representation of a line lying within said region of space, said means comprising means deriving from the scan of said beam an angle voltage the instantaneous magnitude of which is representative of the orientation of said beam within its scanning pattern, means causing the cathode beam of said tube to sweep repetitively across said screen in synchronism with the transmission of the pulses of said system, said sweeps having an angular orientation with respect to a reference point on said screen which is representative of the scan of said beam of energy, means deriving from said scan a delay voltage the instantaneous magnitude of which is a measure of the instantaneous distance between the origin of said beam of energy and the intersection of said beam with said line, a sawtooth generator generating in synchronism with the sweep of said cathode beam a sawtooth voltage waveform having a constant amplitude and the same sense as said delay voltage, means comparing said sawtooth voltage and said delay voltage and generating a voltage pulse at the instant the magnitude of said sawtooth voltage exceeds the magnitude of said delay voltage, and means applying said voltage pulse to said cathode ray tube to intensify said cathode beam.

References Cited in the file of this patent

UNITED STATES PATENTS 2,832,953    Tasker _____ Apr. 29, 1958